June 14, 1938.   R. T. JENNEY   2,120,751
POSITIVE VEHICLE STORAGE AUTOMATIC SYSTEM
Filed Jan. 21, 1927   14 Sheets-Sheet 8
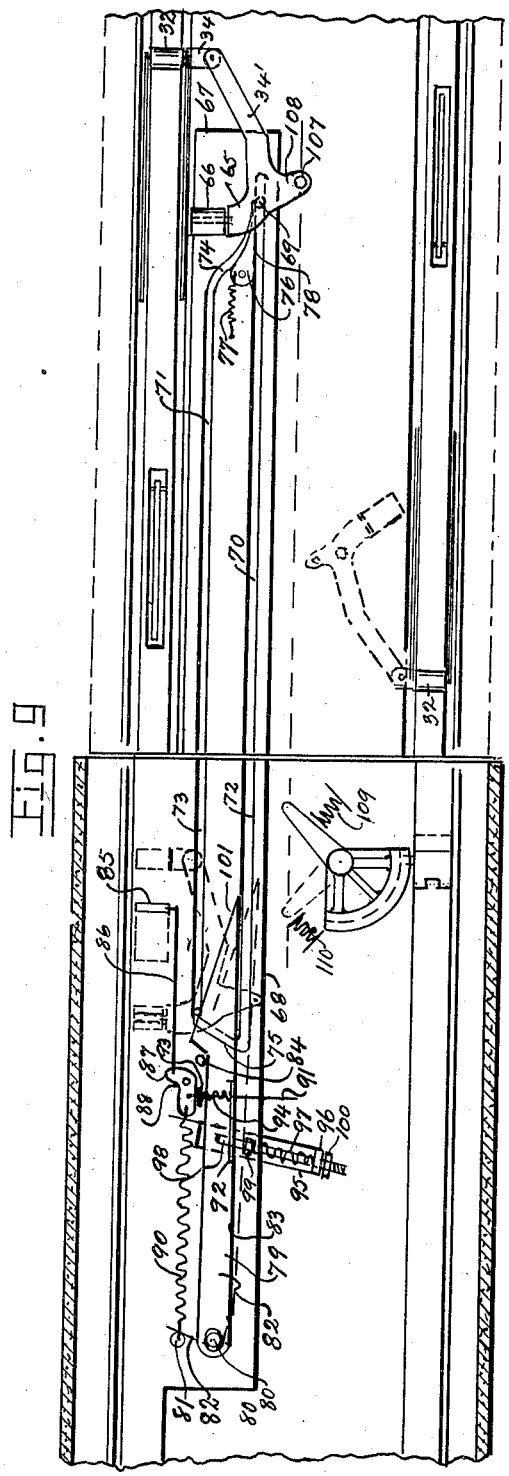
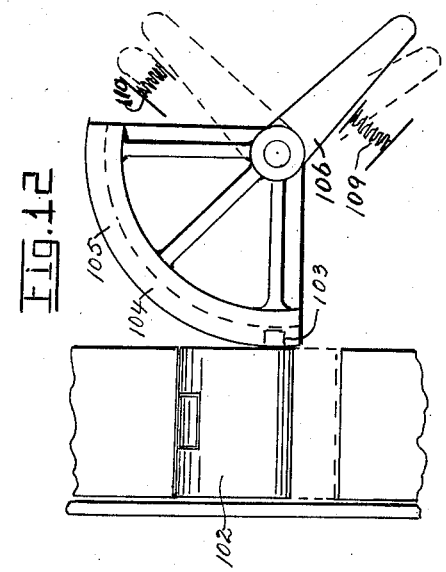
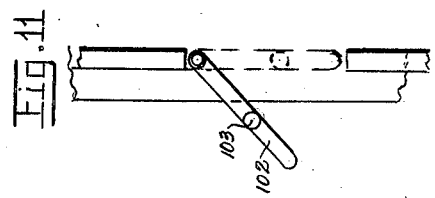
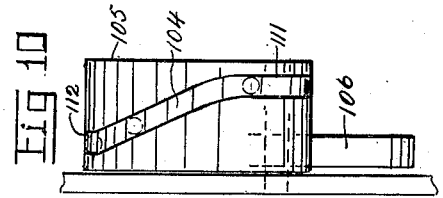
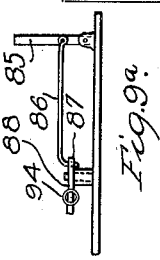
INVENTOR.
ROBERT T. JENNEY
BY Joseph Dugan
ATTORNEYS.

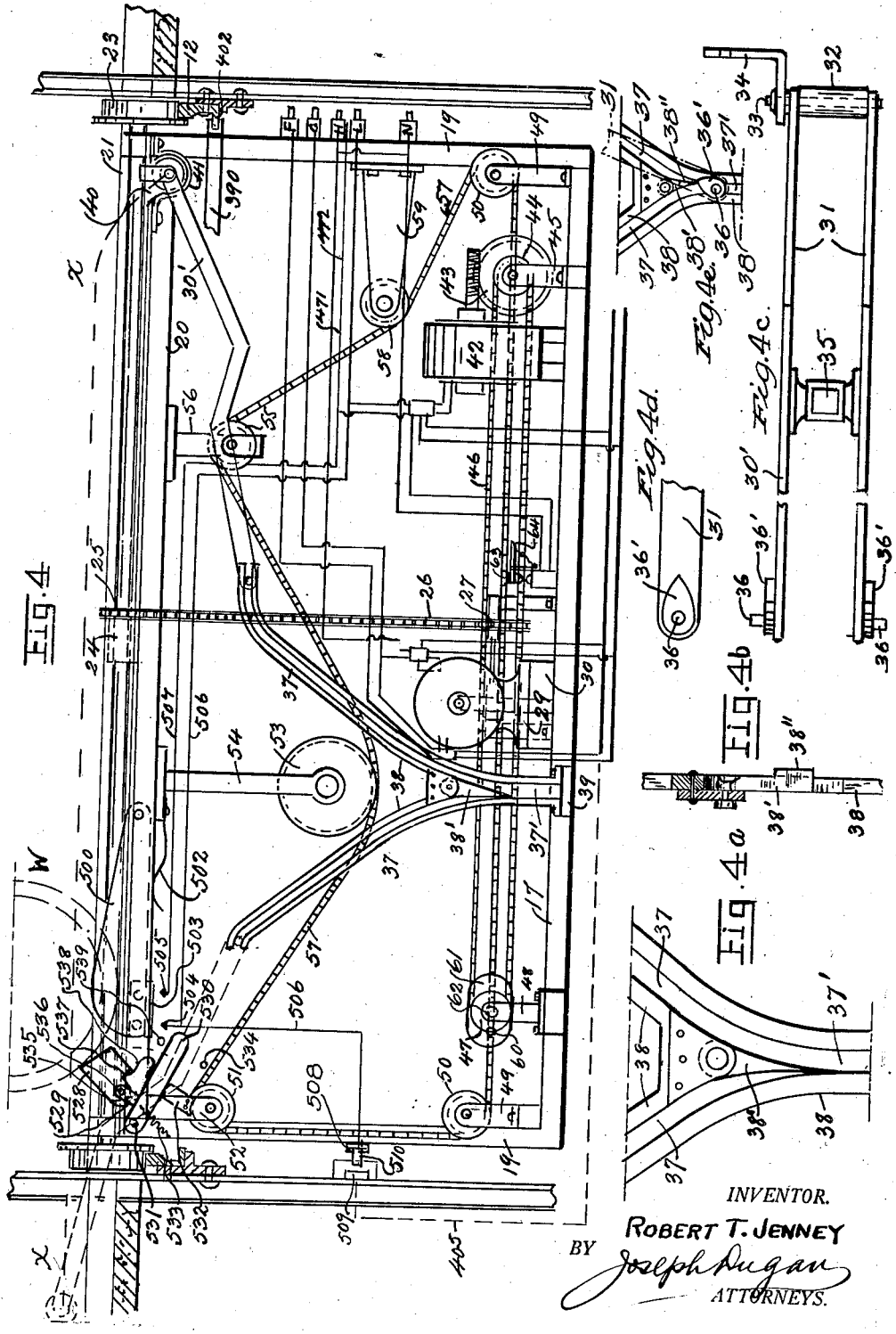

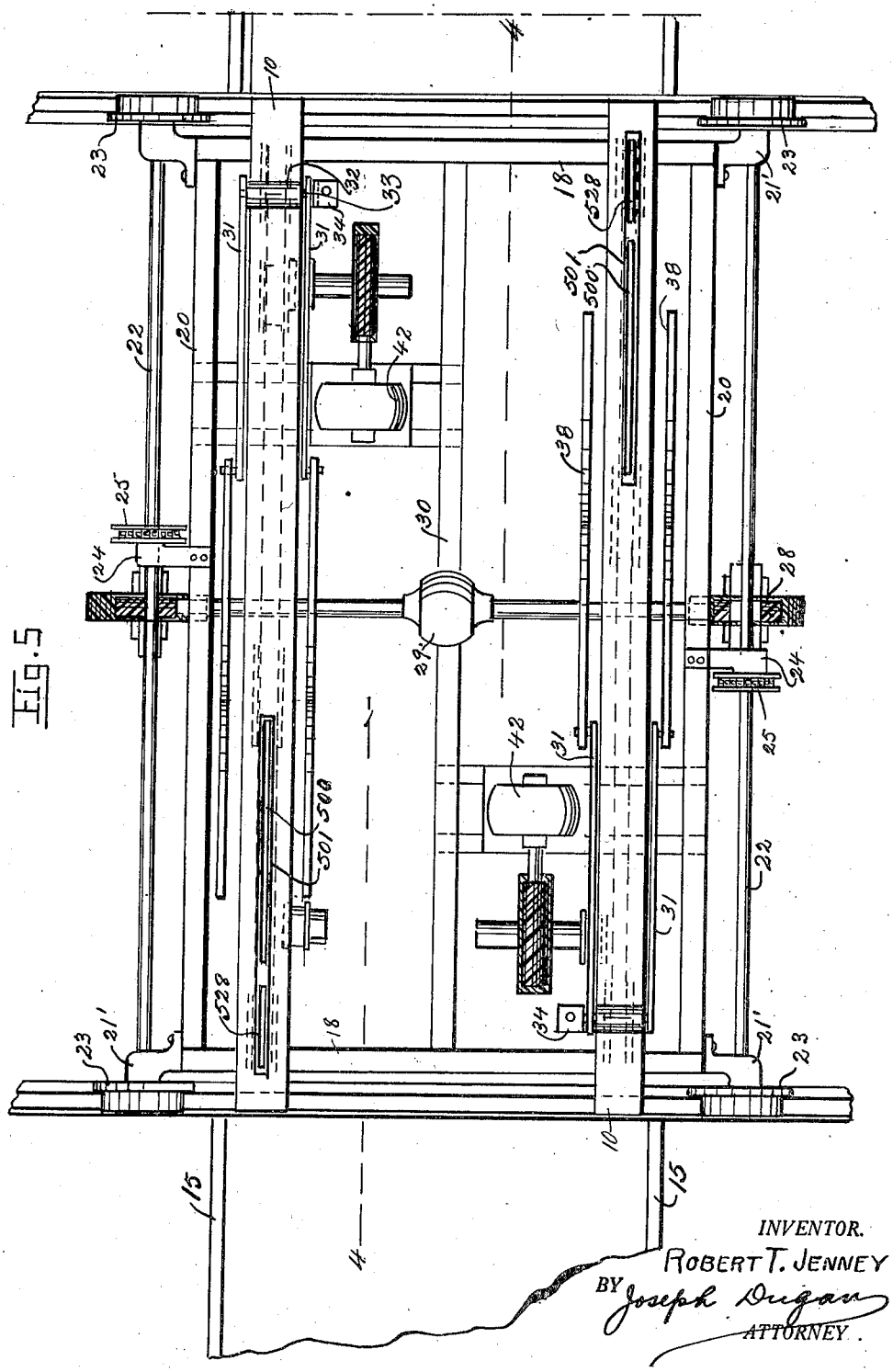

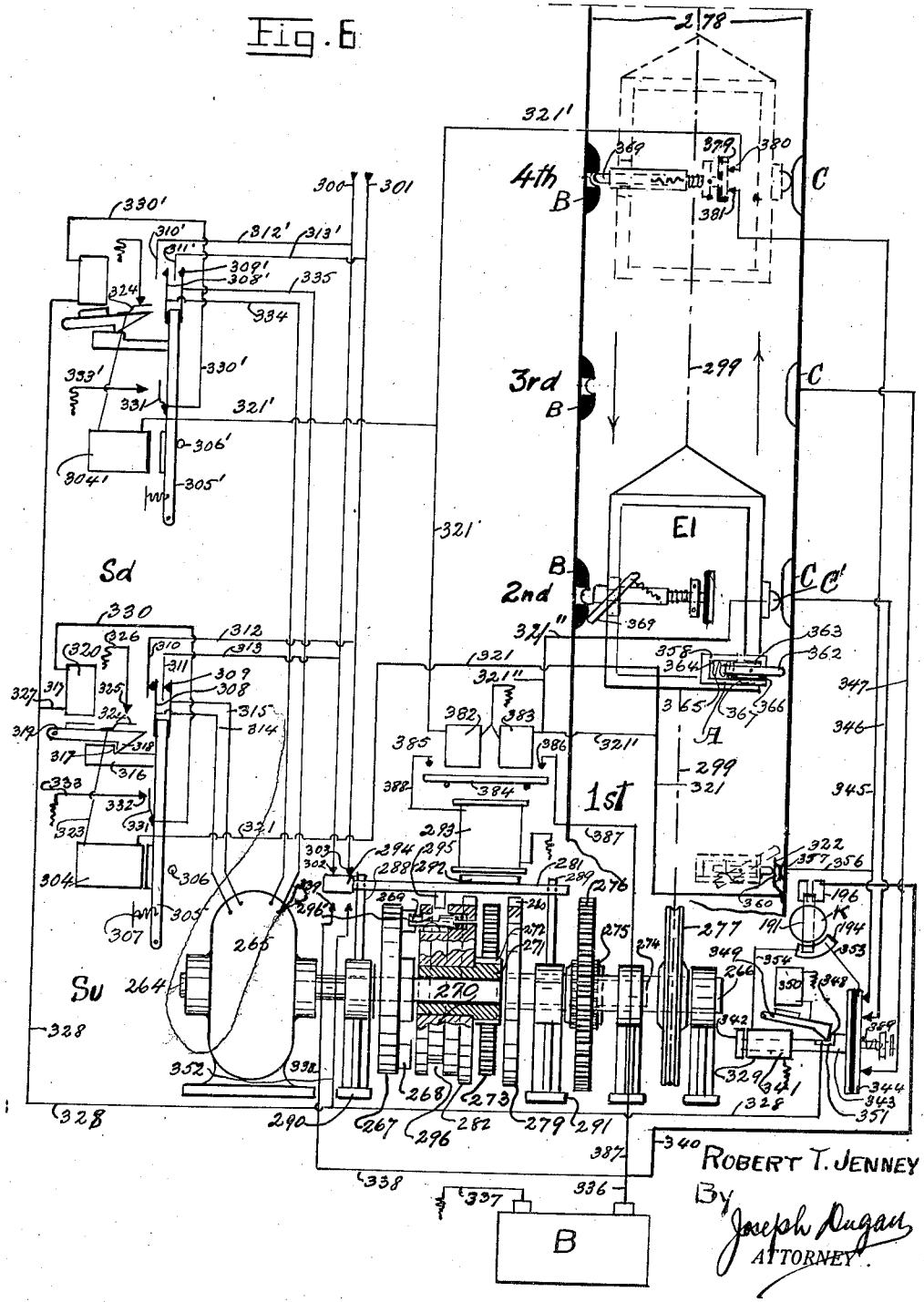

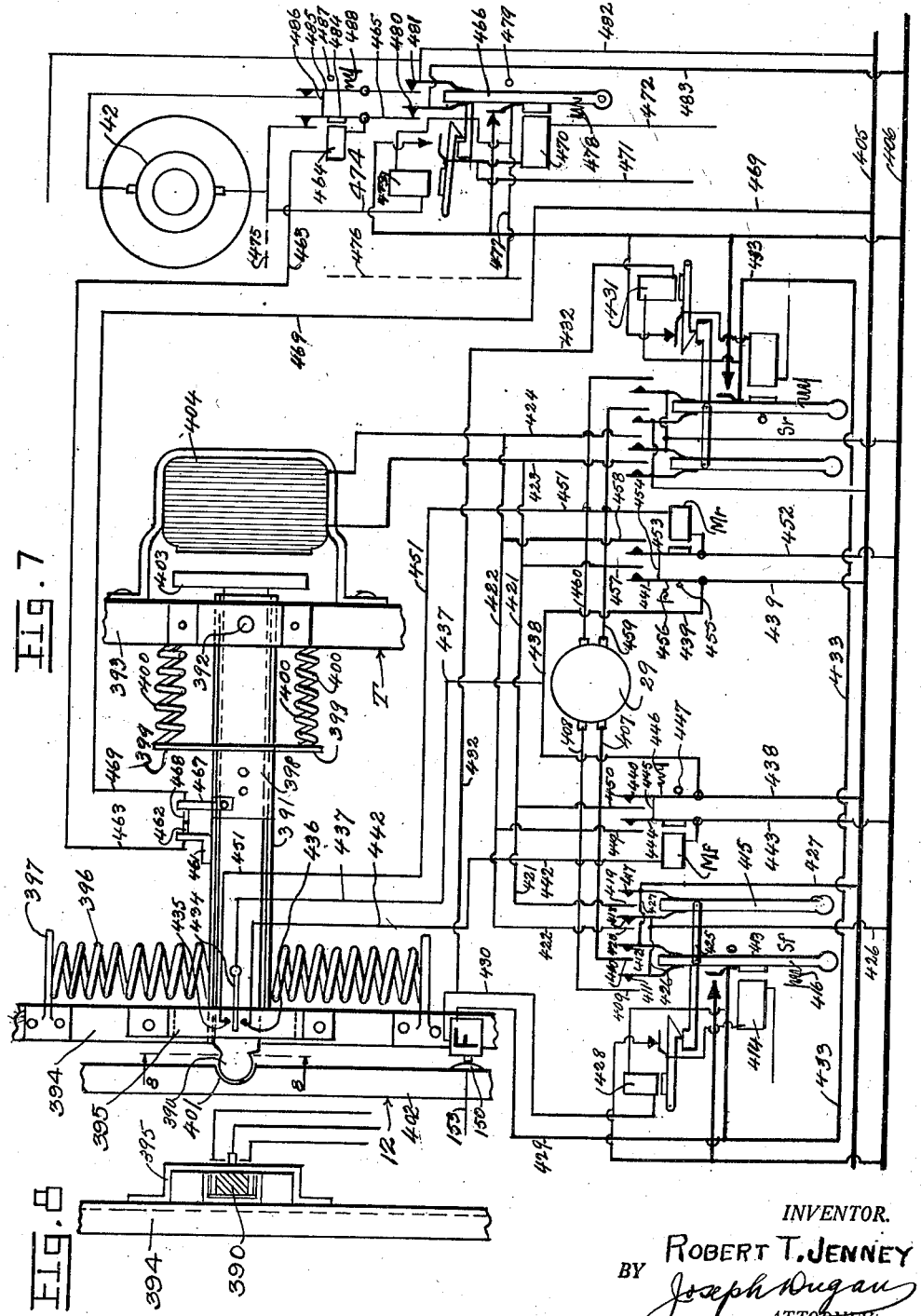

June 14, 1938.  R. T. JENNEY  2,120,751
POSITIVE VEHICLE STORAGE AUTOMATIC SYSTEM
Filed Jan. 21, 1927  14 Sheets-Sheet 9
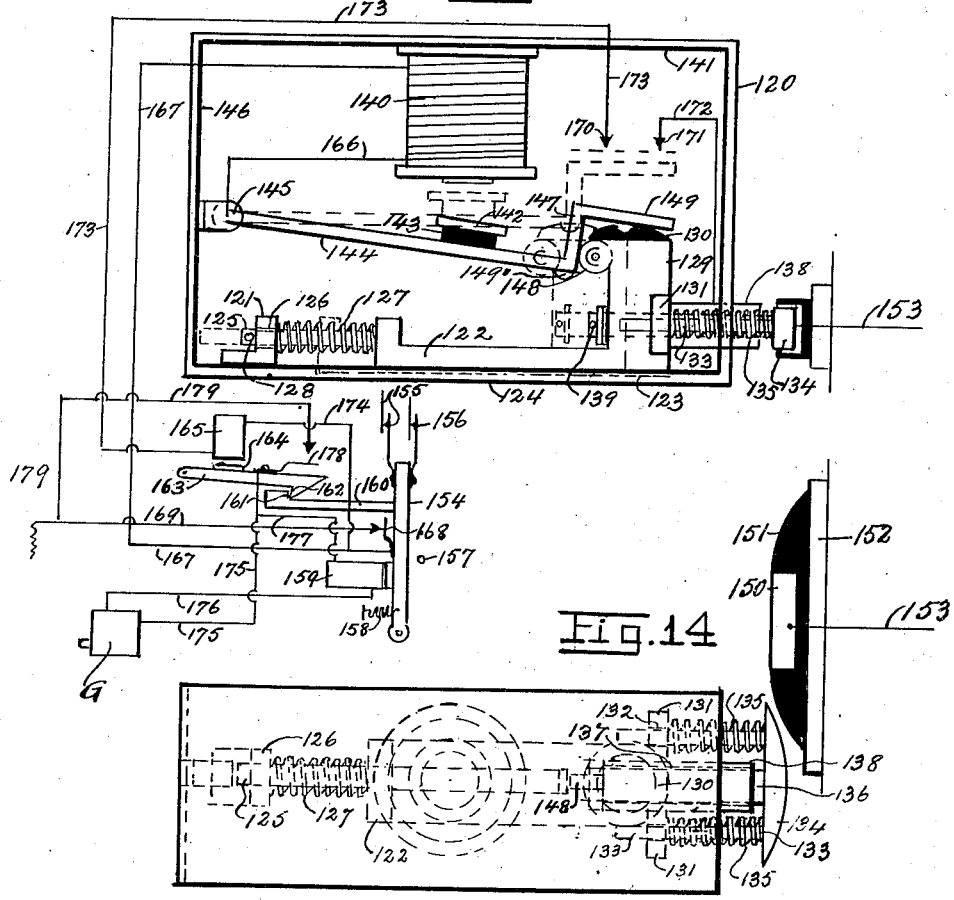
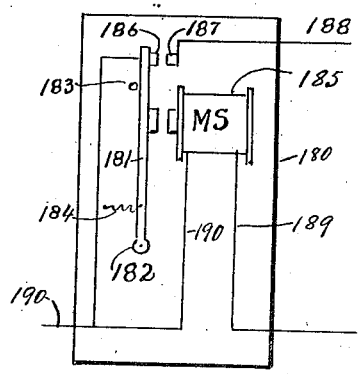
INVENTOR.
ROBERT T. JENNEY
BY Joseph Dugan
ATTORNEY.

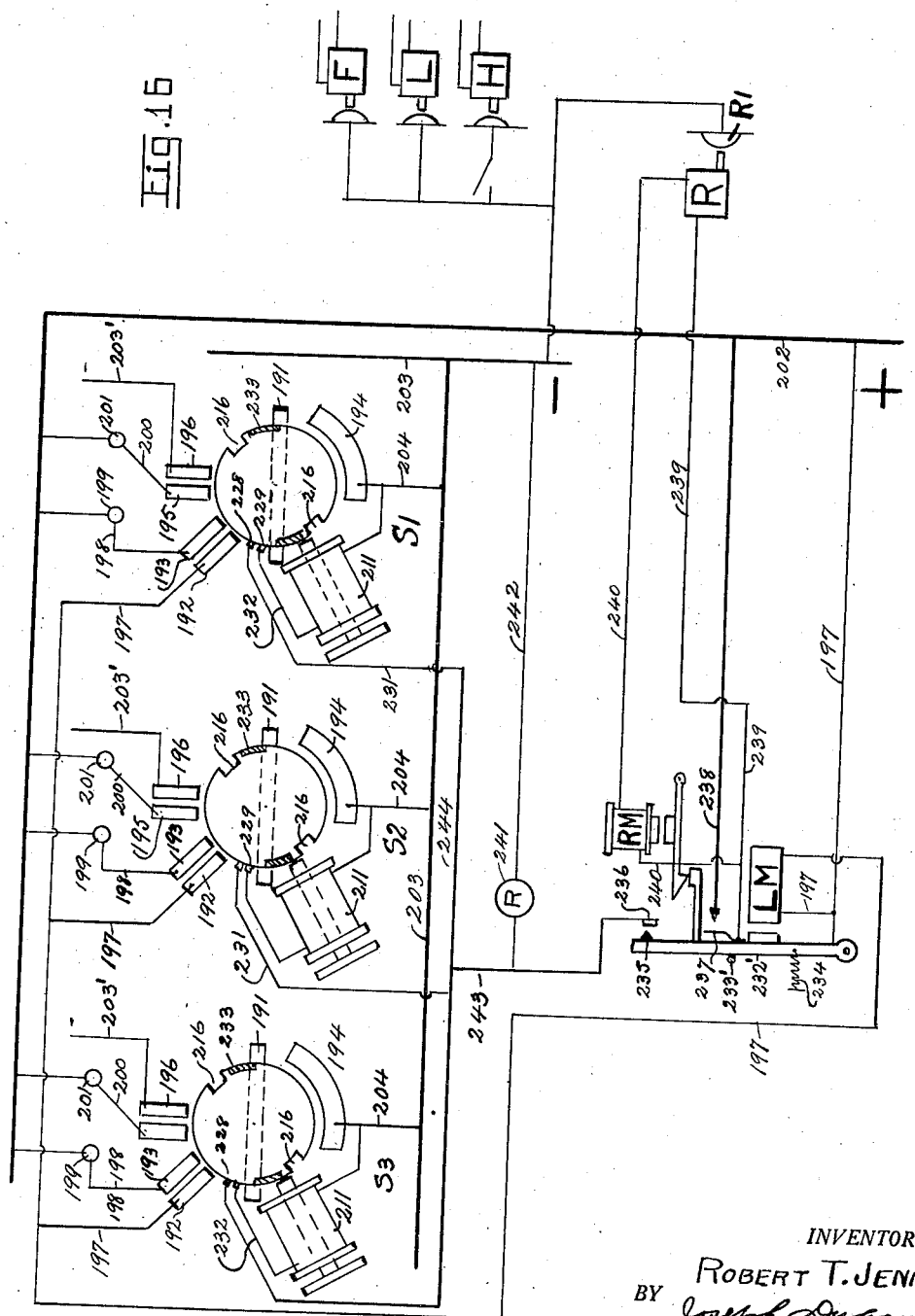

June 14, 1938.  R. T. JENNEY  2,120,751
POSITIVE VEHICLE STORAGE AUTOMATIC SYSTEM
Filed Jan. 21, 1927  14 Sheets-Sheet 11
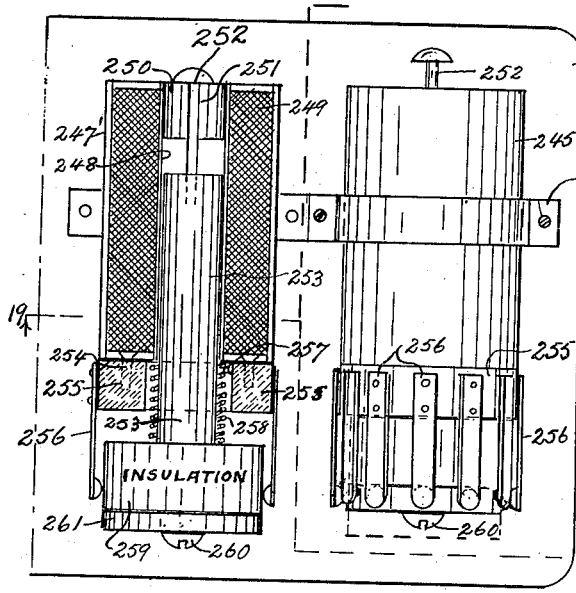
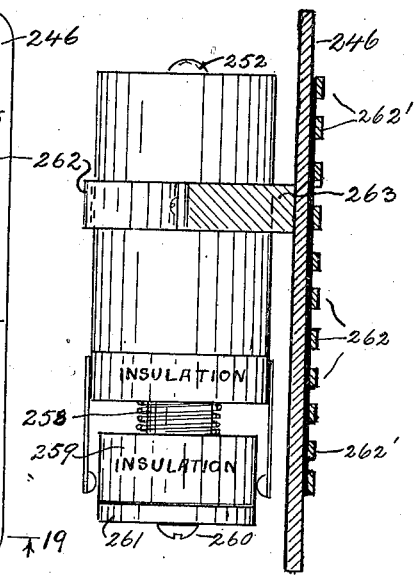
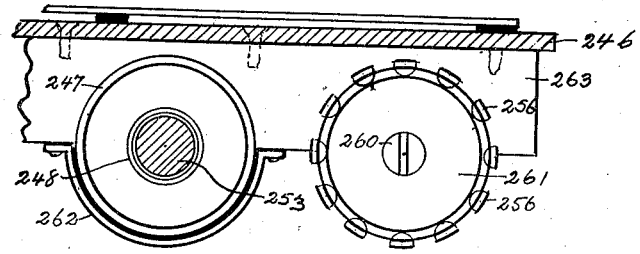
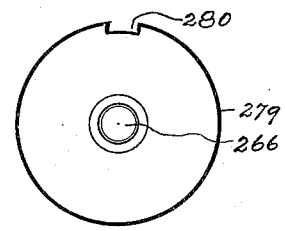
INVENTOR.
ROBERT T. JENNEY
BY Joseph Dugan
ATTORNEY.

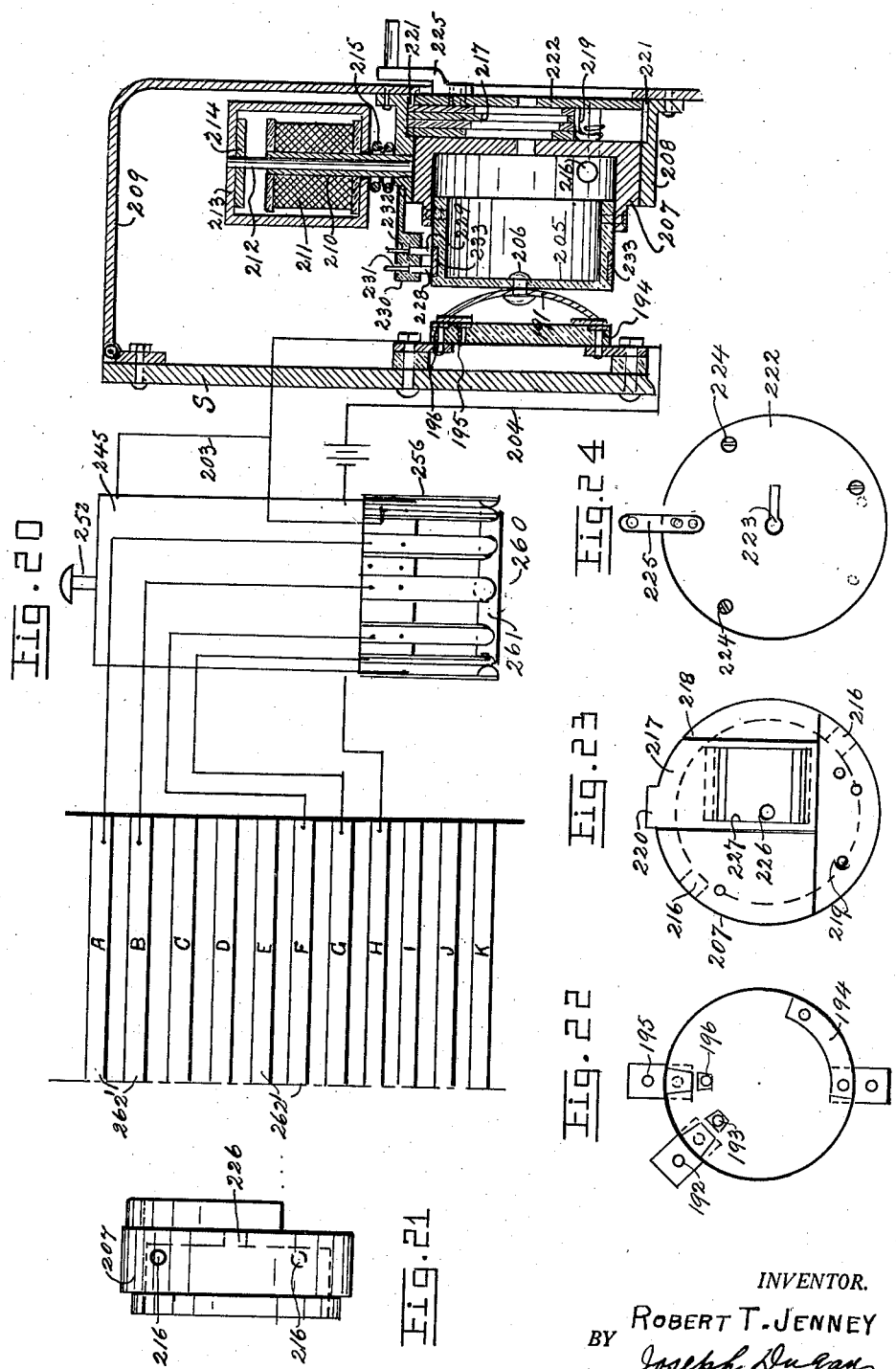

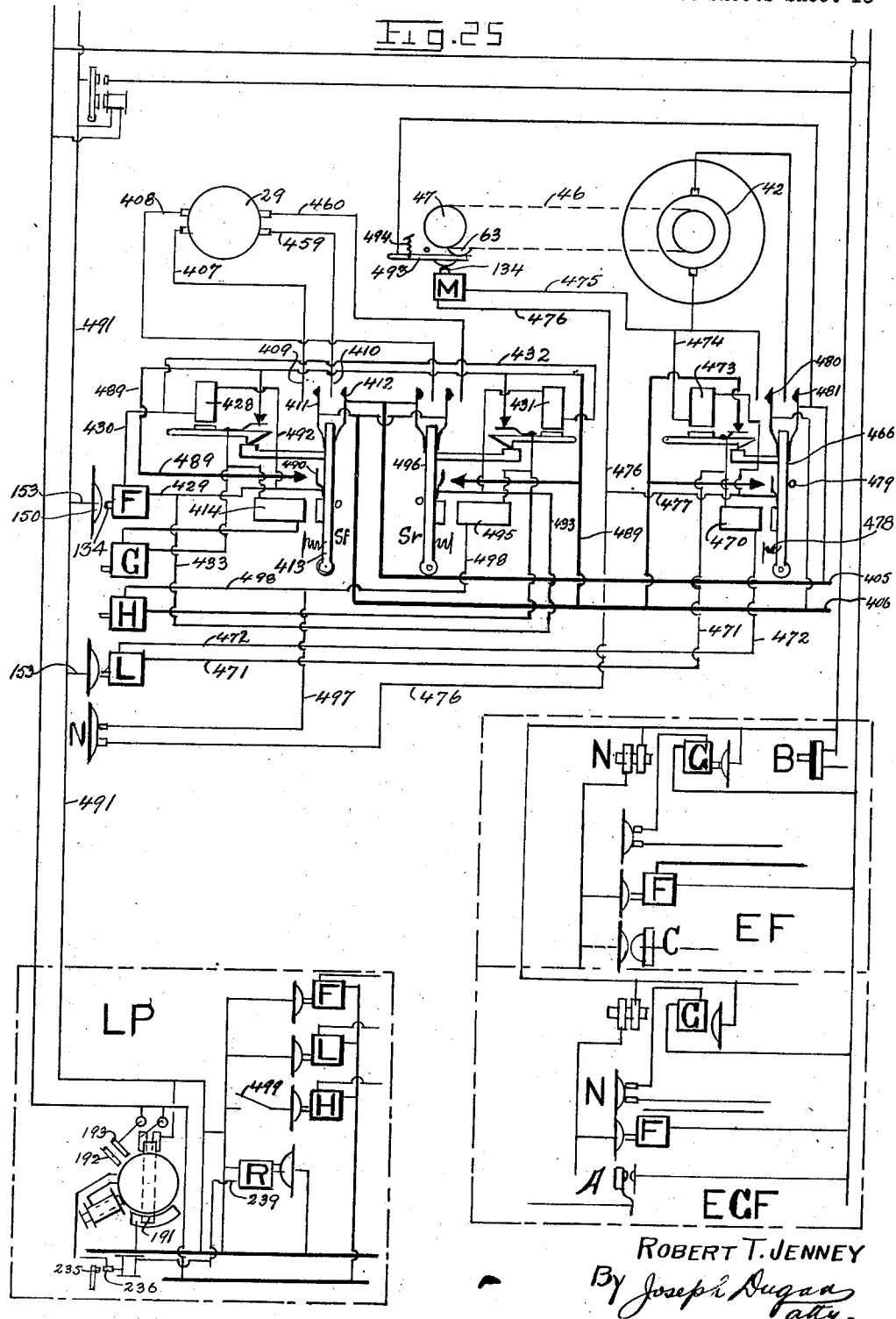

June 14, 1938.    R. T. JENNEY    2,120,751
POSITIVE VEHICLE STORAGE AUTOMATIC SYSTEM
Filed Jan. 21, 1927    14 Sheets-Sheet 14
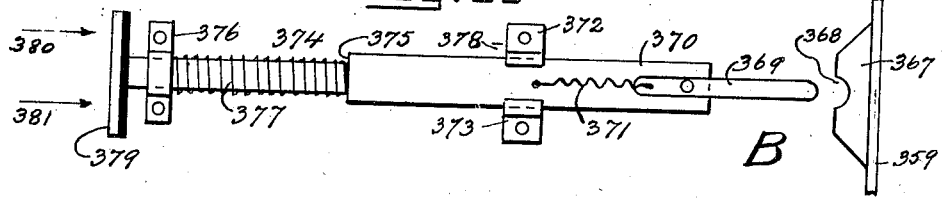
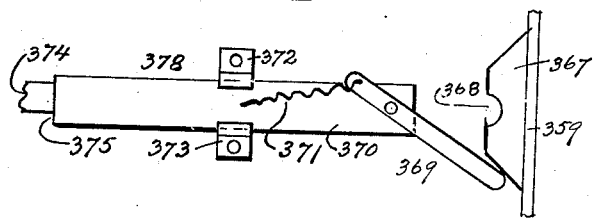
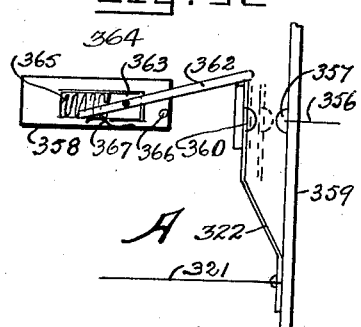
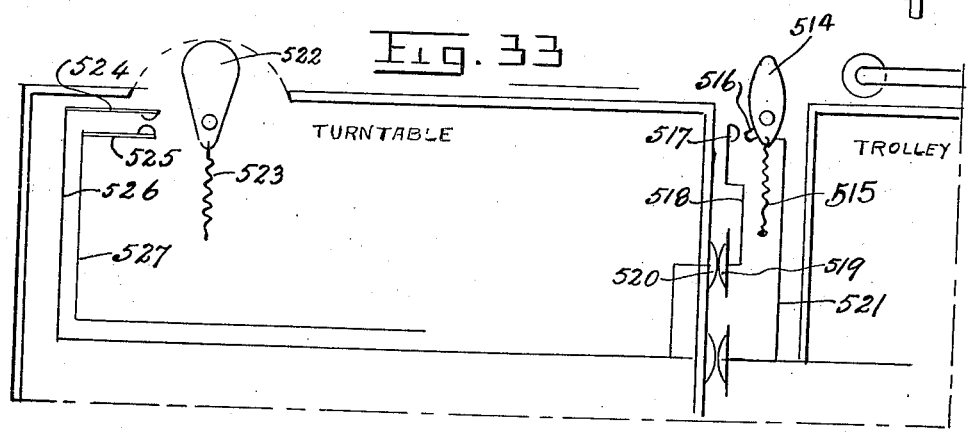
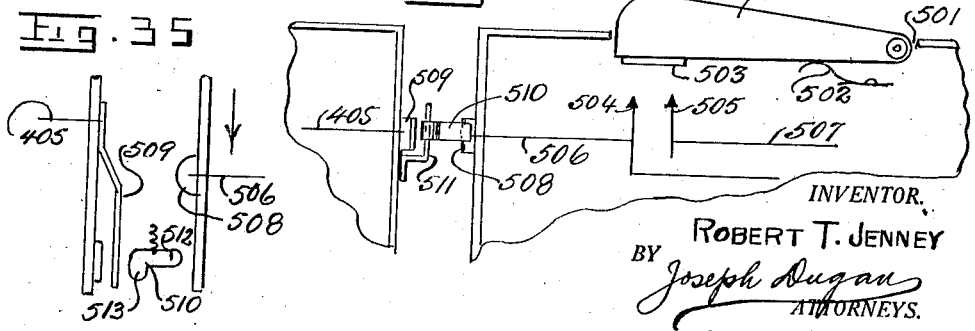
INVENTOR.
ROBERT T. JENNEY
BY Joseph Dugan
ATTORNEYS.

Patented June 14, 1938

2,120,751

UNITED STATES PATENT OFFICE 2,120,751

POSITIVE VEHICLE-STORAGE AUTOMATIC SYSTEM

Robert T. Jenney, Los Angeles, Calif., assignor, by mesne assignments, to Cross Parking Systems, Inc., Chicago, Ill., a corporation of Illinois Application January 21, 1927, Serial No. 162,534

133 Claims. (Cl. 214—16.1)

The invention forming the subject matter of this application is a continuation in part of my copending United States application, Serial Number 24,305, filed April 18, 1925, for Automatic vehicle storage systems.

In the system described in said application, vehicles are stored and locked in stalls on runways somewhat inclined to the horizontal in order that a vehicle in any stall may move by gravity on to a vehicle carrying trolley alined with the stall, after the vehicle locking means in the stall has been released by mechanism carried by the trolley. One drawback to the said system is the constant pressure of the vehicle in the stall against the locking mechanism, with the possible danger of the mechanism giving way and allowing the vehicle to fall out of its stall. In my present system of vehicle storage, I have arranged the vehicle carrying floors and runways everywhere horizontal and have provided locking mechanism of the utmost simplicity, so that nothing short of a complete wrecking of the structure can cause a stored vehicle to fall out of its stall.

The main object of my invention is to provide an automatic system of this type with means for positively controlling the movements of a vehicle during its transfer from one location to another in the structure, and to avoid all tilting of vehicles into gravity actuated movement from one location to another and against stop members which may or may not hold the vehicle. In the present system, the vehicle is constantly guided in runways on horizontal floors and is positively pushed or drawn in one direction or another on said runways by pusher and puller or drawing members which are operated to act on one of the vehicle wheels.

Other objects of the invention will become apparent as the detailed description thereof proceeds.

In the drawings:—

Figure 4 is a sectional elevation of a vehicle carrying trolley taken on the line 4—4 of Figure 5;

Figure 5 is a plan view of said trolley, with the vehicle retractor mechanism omitted for clearness of illustration;

Figure 6 is a diagrammatic wiring layout of the elevator control parts of this system;

Figure 7 is a plan view and wiring diagram of a micrometer stop mechanism used in this system to lock the vehicle carrying trolley in exact predetermined position relative to any desired stall;

Figure 8 is a section on the line 8—8 of Figure 7;

Figure 9 is a fragmentary plan view of guide and locking mechanism used on the vehicle carrying trolley and in the stalls to move a vehicle into the stall and lock it therein, and to unlock a vehicle and withdraw it from the stall;

Fig. 9a is a detail of the stall trip plate and associated parts for depressing the shunt plate controlling the operation of the pusher.

Figure 10 is a fragmentary elevation of a segmental cam plate forming part of said locking mechanism;

Figure 11 is a fragmentary elevation of a pivoted locking plate adapted to contact with a vehicle wheel in a stall and operatively connected to said cam plate;

Figure 12 is a fragmentary plan view of the said locking mechanism, showing the parts thereof in locking position;

Figures 13 and 14 are elevation and plan views, respectively, of a circuit making and breaking contactor designed for use throughout this system;

Figure 16 is an explanatory wiring diagram of the switch locking and signalling mechanism used in the system;

Figure 15 is a detail of a magnetic switch used in the system;

Figure 17 is a front elevation of part of a relay board, showing one of the relays used in the system in elevation and another one in central vertical section;

Figure 18 is a fragmentary side elevation of the relay board showing a series of bus bars mounted on the back of the board and adapted to be connected as desired to any one or more of the relays shown on the front of the board;

Figure 19 is a horizontal section on the line 19—19 of Figure 17;

Figure 20 is a central vertical section of one of the key controlled switches, shown as connected to a relay controlled thereby and wired up to several of the bus bars carried by the relay board, the relay and bars being illustrated diagrammatically;

Figures 21 to 24, inclusive, are details of the switch locking mechanisms;

Figure 25 is a wiring diagram of the system;

Figures 26 to 29, inclusive, are details of the elevator control gearing shown in Figure 6;

Figure 30 is a fragmentary elevation of switch carried by the vehicle carrying trolley and used to operate the elevator down from any of the upper floors of the system after the trolley has moved from a stall into the elevator at the floor;

Figure 31 is a fragmentary elevation showing the said switch with the parts thereof positioned as it contacts with a cooperating fixed contact block as the elevator, with the trolley carried thereby, moves up from one floor to another;

Figure 32 is a fragmentary elevation of a switch carried partly by the trolley and partly by the fixed structure of the system at the ground floor thereof and back of the elevator and operable to send the elevator up in its shaft only when the trolley moves from its loading point LP to and into the elevator;

Figure 33 is a wiring diagram showing the means for operating a turntable automatically by the action of the trolley pusher to turn and stop the turntable in a predetermined position;

Figure 34 is a diagrammatic sketch showing mechanism controlled by the weight of a vehicle on the trolley to determine whether the trolley pusher mechanism shall operate or not as the trolley arrives at its loading station;

Figure 35 is a plan view of the switch contact mechanism shown in Figure 34; and Figures 4a, 4b, 4c, 4d, and 4e show fragmentary details, to an enlarged scale, of several parts of the pusher mechanism illustrated in Figure 4.

Figure 1:
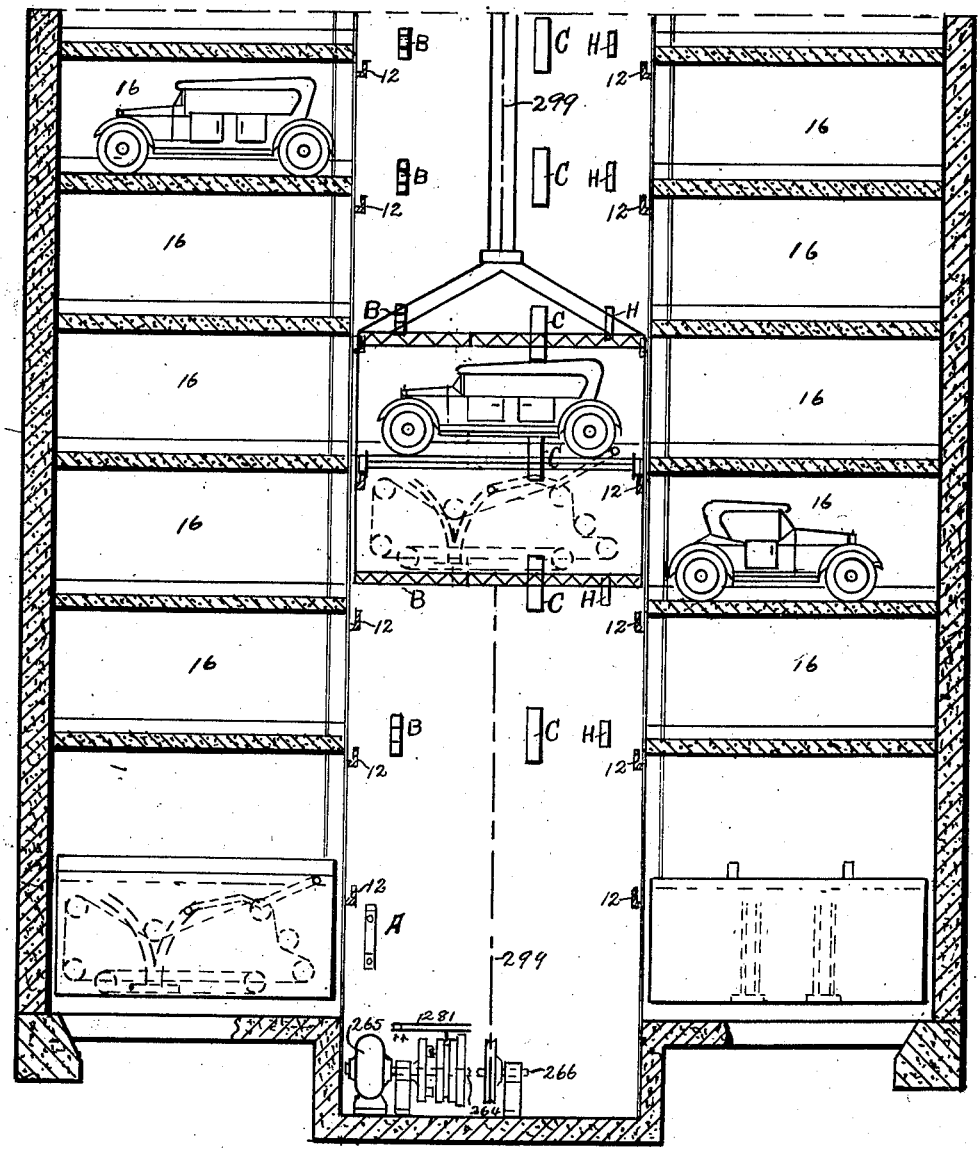
Fig. 1 is a diagrammatic layout of the system in elevation.
Figure 2:
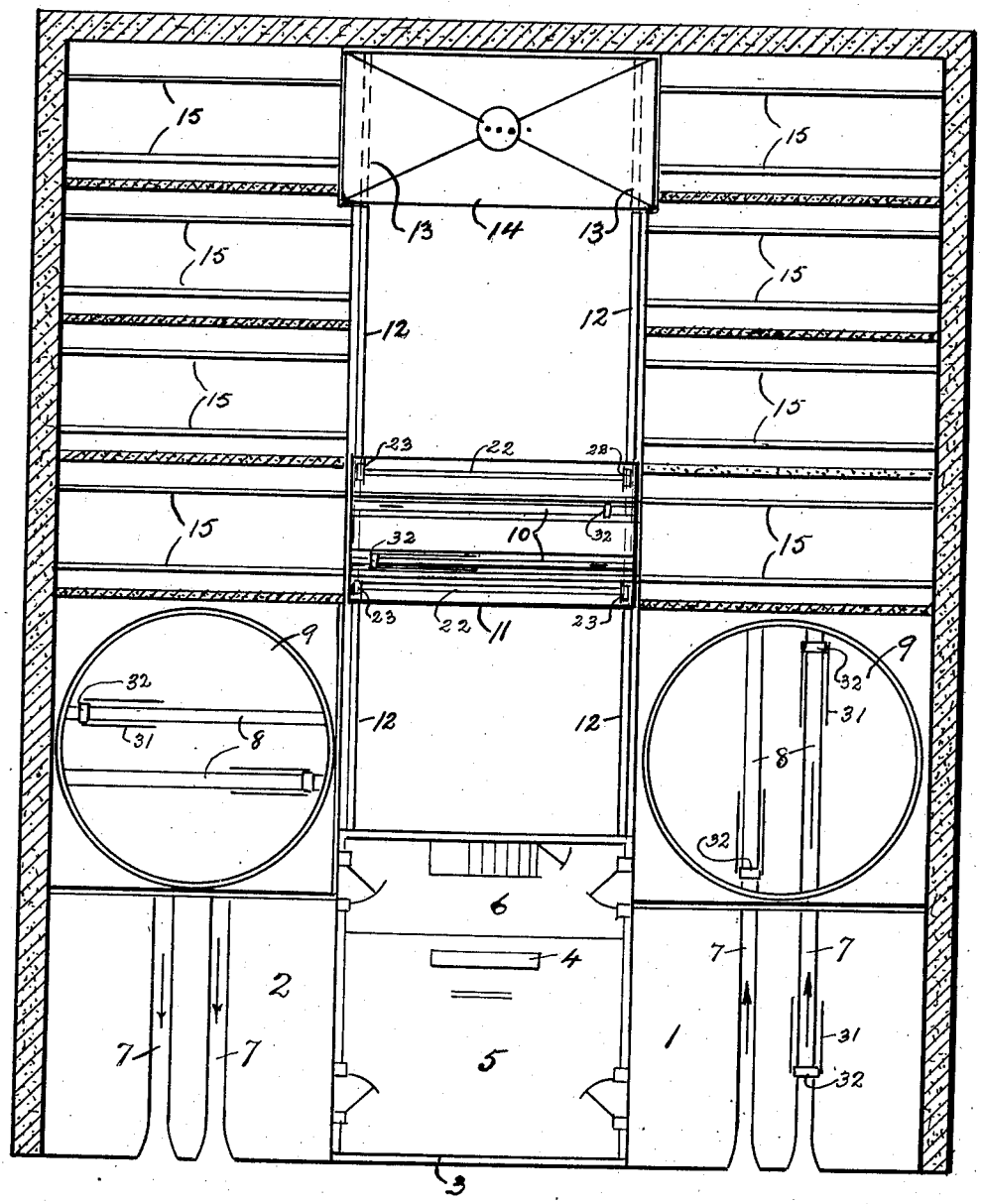
Fig. 2 is a diagrammatic plan thereof.
Figure 3:
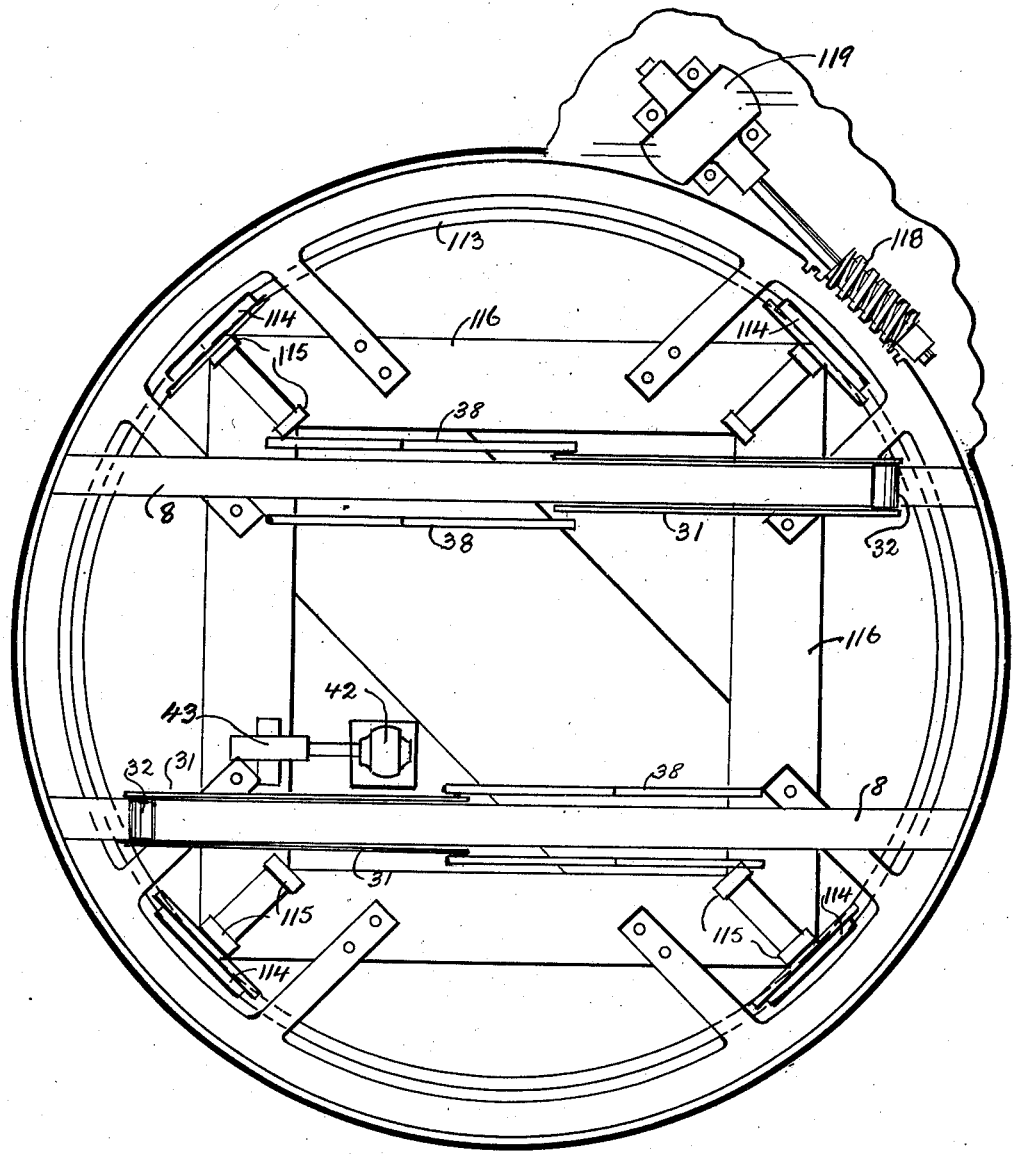
Figure 3 is a plan view of one of the turntables used in the system.

In Figures 1 and 2 of the drawings, the system is shown as including a framework constructed to provide a plurality of horizontal groups of stalls arranged vertically in tiers.

The ground floor is shown in Figure 2 as comprising an entrance wing 1 and an exit wing 2 arranged on opposite sides of a room 3 which is divided by a key operated switch board 4 into a customer's part 5 and an attendant's office 6. Runways 7 are formed in each wing and are adapted to aline with similar runways 8 on turntables 9, which may be rotated to cause their runways 8 to aline either with the runways 7 or with the runways 10 of the trolley 11 mounted to move on the horizontal supporting rails 12 fixed on the vertical framework of the system to aline with similar rails 13 on the elevator 14.

The structure as a whole is arranged so that the trolley may be lifted by the elevator to any desired tier, and may then be moved horizontally in that tier toward and from the elevator to deliver or remove a vehicle to or from any desired stall in that tier. In order to effect this, each tier of stalls has a rail 12 secured to the vertical framework in such positions that the runways 10 of the trolley are always on the same horizontal level as the runways 15 in each of the stalls 16. Each stall has a pair of these runways spaced apart to correspond to the spacing of the trolley runways 10 and to the standard spacing of the wheels of such vehicles as would normally be presented for storage by the system.

One of the most important units of this system is the vehicle pusher mechanism, which is designed for use mainly in moving a vehicle from a trolley into the stalls, to set locking mechanism in each stall to hold a vehicle therein, to release this locking mechanism and withdraw a vehicle previously locked in a stall from said stall and onto the trolley. This pusher mechanism is shown in detail in Figures 4 and 5 as mounted on the trolley, but it must be understood that it may be used wherever found necessary or desirable in the system. For example, it may be used in the entrance wing 1 to move a vehicle from a given position adjacent the office 5 onto the entrance wing turntable, and may be used on each turntable to move a vehicle onto or off from the trolley or onto the runways in each wing.

The trolley framework comprises horizontal side members 17, cross members 18, and vertical uprights 19, all suitably secured and braced together to form a carrier for a vehicle and for such mechanism as may be necessary to move the trolley, with or without its load, to and from any desired location in the system.

Upon the upper cross members 20 of the trolley, the vehicle runways 10 are secured and are flanked by wheel guiding flanges 21 between said runways and the outer sides of the trolley. These runways may be slightly depressed or provided with suitable scotches to retain a vehicle centrally positioned on the trolley. Bearings 21' extend from the upper corners of the trolley framework to receive shafts 22 which, at each end thereof, are provided with flanged rollers 23 adapted to ride upon the supporting rails 12 and 13. Each shaft 22 is centrally journaled in a bracket 24 secured to the upper members 20 of the trolley framework, and has secured thereto a driven sprocket wheel 25. A drive chain 26 extends around the sprocket wheel 25 and around a driving sprocket 27 operated by the worm gearing 28 of a driving motor 29 fixed centrally to a cross strut 30 at the lower end of the trolley framework. It will be obvious from the drawings that energization of the motor 29 in one direction or the other will cause rotation of the flanged trolley wheels 25 to drive the trolley in any desired direction on the rails 12 and 13.

In order to move a vehicle in either direction from the trolley, the latter is provided with duplicate independently operated pushers, only one of which is described in detail herein, although both are shown in Figure 5.

Each pusher lever 30' (see Fig. 4c) comprises a pair of plates 31 spaced apart at one end by a roller 32 mounted to rotate on the pivot rod 33 secured to one end of each of said plates. A swivel 34 is pivoted to the rod 33 and has pivotally connected thereto the vehicle retractor 34' (Fig. 9) which, with other mechanism to be described later, serves to operate a combined vehicle locking and releasing mechanism and to withdraw vehicles from their stalls. A combined spacer and cable grip 35 spaces and secures together the plates 31 intermediate the ends thereof; and the ends of these plates 31, opposite the ends to which the roller 32 is secured, are provided with guide trunnions 36 adapted to slide in cooperating guide grooves 37 which are formed in a vertical bifurcated pusher guide 38 fixed to the cross bar 39 of the trolley framework.

At the start of the pusher movement, the pusher lever 30' is positioned so that its roller 32 lies below the bottom of the trolley runway 10, in order to permit the passage of a vehicle thereonto. To provide for this, the runway 10 is broken to form a passageway 40 for the roller 32, and the two parts of said runway are fixed in alinement with each other by a suitable roller receiving casing member 41, shaped to receive the roller 32 below the runway 10, and by such other bracing members as may be necessary to support the said parts properly.

A combined chain and cable drive is provided to move the pusher lever so as to cause the roller 32 to rise out of the casing 41 and to move over the top of the runway to and across the other end of the trolley and into a stall to position a vehicle therein or remove one therefrom. The chain drive starts with a motor 42 which, through the worm gear drive 43, rotates the sprocket wheel 44 supported along with said drive on the brackets 45 adjacent one end of the trolley frame. An endless chain 46 extends around the sprocket wheel 44 and around a second sprocket wheel 47 supported on the bracket 48 adjacent the other end of the trolley frame.

Standards 49 at each end of the trolley frame carry guide wheels 50 with the lower edges thereof in alinement with the centers of the sprocket wheels 44 and 47. A third guide wheel 51 is secured by a bracket 52 to the bottom of runway 10 vertically over one of the guide wheels 50, and a fourth wheel 53 is held by a bracket 54 at a predetermined position and distance from the top of the runway 10 and is centered between the furcations of the guide 38. A fifth wheel 55 is also mounted in a predetermined position relative to the passageway 40 and the center of the guide 38 in a bracket 56 suitably secured to the trolley frame-work so as to permit the pusher lever to ride over the top of the wheel 55 to such position as may be necessary for the lowering of the roller 32 below its runway. A cable 57 extends around the guide wheels 50, 51, and 55, below wheel 53, and against a takeup wheel 58 rotatably mounted in a bracket 59 suitably fixed to the trolley framework.

A pivot 60 pivotally connects a connector 61 to the drive chain 46 and this connector is, in turn, pivotally connected to the cable 57 by a pivot 62, the distance between these two pivots being exactly equal to the radius of each of the drive wheels 44 and 47. This construction serves to maintain the cable 57 approximately centered between the upper and lower stretches of the chain 46 during the operation of the pusher, and thereby eliminates the undue stretching of the cable 57 which would otherwise result from direct connection of the cable 57 to the chain 46 and the consequent raising and lowering of the cable 57 to the top and bottom of the sprocket wheels 44 and 47. A cam 63 is fixed to the chain 46 to contact with a contact arm 64 (see Figure 4) and stop the pusher motor at the termination of the pusher operation. The relative lengths of the chain 46 and cable 57 and the positions of the several parts of the pusher mechanism are so predetermined that the pusher mechanism, between the starting and stopping of the pusher motor, moves the roller 31 out of the casing 41 and across the top of the runway 10 into a stall and back again to its starting position in the casing 41. To effect this cycle of operation, it is essential that the distance between the centers of sprocket wheels 44 and 47 be exactly equal to the draw of the cable 57 over its wheels in moving the pusher roller from its position at one end of the trolley runway to its extreme position at the other end thereof. This necessarily follows from the fact that continuous rotation of the chain 46 in one direction is used to cause reciprocation of the cable 57.

The cable 57 is secured to the grip 35 at the point where the cable passes through the grip when the pusher is in its rest position and the cam 63 and connector 61 are in the pusher starting operation positions shown in Figure 4. In this figure, the guide grooves 37 are shown as intersecting in a common vertical groove 37'; and in order to ensure the trunnions 36 being transferred from one guide groove to the other during the movement of the pusher in either direction across the trolley, the pusher guide 38 is provided, near the intersection of the guide grooves 37, with a pointed pivoted plate 38' having a projection 38" on its rear face adapted to contact with either side of a cam 36' formed adjacent the trunnion 36 on each plate of the pusher lever. It will be apparent from the drawings that when the pusher motor is started in operation, the trunnion 36 of the pusher lever will be moved down the right hand branch of the guide 38 and into the vertical groove 37' and the roller 32 will be raised out of the casing 41 and moved along the runway 10. When the pusher lever is vertical, the trunnion 36 has reached its downward limit in the groove 37'; and, as the pusher lever moves over toward the stall, the trunnion rises in the groove 37', the right hand edge of the cam 36', as considered in Fig. 4, contacts with the left hand side of the projection 38" and thereby moves the point of the plate 38' over into contact with the right hand side of the vertical groove 37', which then becomes a continuation of the left hand branch groove 37. This shunting operation is repeated as the pusher lever moves back from the stall end of the runway to its rest position in the casing 41. This operation is illustrated in Fig. 4e. The trolley runways may be slightly depressed or provided with scotches to retain a vehicle centrally positioned on the trolley.

The stall floors of this system are horizontal and may even be slightly inclined to the horizontal so as to tend to move the vehicles against the back walls of the stalls and away from the trolley. In this case, however, they are shown as horizontal and it becomes necessary to provide mechanism for locking a vehicle in its stall after it has been pushed into it, and also for releasing this locking mechanism and withdrawing a vehicle from its stall onto the trolley. Mechanism for this purpose is shown in detail in Figures 9, 10, 11 and 12.

The retractor 34' (see Figure 9) is pivoted at one end to the swivel 34 and is curved to form an offset 65 on the end of which is pivoted the retractor roller 66. The retractor travels over and is guided by alined track members 67 and 68 fixed on the trolley and stall floors, respectively. These track members are provided with alined grooves which guide a pin 69, depending from the retractor 34', to hold the retractor out of engagement with a vehicle wheel when the pusher is operating to move a vehicle into a stall, and to move the retractor into engagement with the wheel of a vehicle stored in a stall and to withdraw it from storage therein.

The grooves 70 and 71 of the trolley track member 67 aline with the grooves 72 and 73, respectively, of the stall track member, and have their ends connected by cross grooves 74 and 75, respectively, to form a continuous guide circuit for the retractor pin 69. A frog 76 is pivoted on the trolley track member 67 between the grooves 70 and 71, and is controlled by the spring 77 to close the grooves 70 and 74, and is shaped so that its edge 78 normally alines with one edge of the groove 70.

On the stall member 68, a shunt plate 79 is pivoted on pivot 80, and is shaped and spring controlled so as normally to prevent passage of the pin 69 from the groove 72 into the cross groove 75. A pin 81 on the member 68 serves as an anchor for one end of a spring 82 which coils around the pivot 80 and is bent up and around the edge 83 of the shunt plate 79 to force the latter against the stop pin 84 fixed on the member 68, with the edge 83 in alinement with one edge of the groove 72.

On the runway 15, in about the position the right rear wheel of a vehicle would normally occupy when properly stored in a stall, there is pivoted a plate 85 normally held perpendicular to the runway 15 by a link 86 which is pivoted to the edge of the plate 85 at a suitable distance from the hinge connection between the plate 85 and the runway 15. This link 86 has its other end bent down and pivoted into an arm 87 of the bell crank 88 which is pivotally mounted on the track member 68. The plate 85 is pivoted on a horizontal axis extending transversely of the runway and, when depressed, occupies the position indicated by dotted lines in Fig. 9. The mounting of this plate and the connection between the same and the bell crank lever 88 are clearly shown in Fig. 9a. The other arm 89 of the bell crank is connected by a spring 90 to the anchor 81, and the link 86 is of such length that when the bell crank is acted upon by the spring 90 only, the plate 85 is perpendicular to the runway 15.

A rod 91 has one end pivoted to the bell crank arm 89 and passes freely through a lug 92 pressed laterally upward from the shunt plate 79, and has a nut 93 secured thereon to form an abutment for one end of the spring 94 which is wound on said rod between the lug 92 and the nut 93.

Projecting laterally from and fixed to the track member 68 is an arm 95 having its end 96 upturned to serve as one abutment for a strong spring 97 which is wound around a rod 98 passing through suitable apertures in the lug 92 and the upturned end 96. A nut 99 is fixed to the rod 98 and serves as one abutment for said spring 97; and a second nut 100 is threaded on to the end of the rod 98 where it projects outwardly through the upturned end 96 to serve as a means for adjusting the rod 98 so as to space the nut 99 from the lug 92 at such a distance that the plate 79 is not subjected to the action of the strong spring 97 until the edge 101 of the shunt plate 79 lies across and obstructs the groove 72.

If the pusher were operated without a vehicle being either on the trolley or in the stall, the retractor guide pin 69 will merely reciprocate in the alined guide grooves 70 and 72 without moving the retractor laterally across the runways 10 or 15.

When the trolley arrives at a stall with a vehicle to be stored therein, the pusher roller alone engages the rear end of the right rear wheel of the vehicle to push the vehicle into the stall; and the retractor pin 69, riding in the alined grooves 70 and 72, holds the retractor out of engagement with the front of said right rear wheel. As the vehicle moves into the stall, its right front wheel passes over and momentarily depresses the plate 85 to cause the linkage mechanism to move the shunt plate 79 over into the groove obstructing position shown by dotted lines. After the front wheel has passed over this plate 85, the several springs restore the plates 79 and 85 to their normal positions. As the vehicle continues its movement into the stall, the pin 69 moves in groove 72, ahead of the right rear wheel of the vehicle, and rides against the edge 83 of the shunt plate 79 and prevents it moving into the dotted line position, even after the vehicle is in its stored position and is holding the plate 85 depressed. The edge 83 of the shunt plate prevents the pin 69 from entering the cross groove 75, and when the pusher moves away from the stall the pin 69 returns with it in the same grooves 72 and 70. As soon as the pin 69 moves back free of the edge 83, the spring 94 moves the shunt plate until the edge 101 thereof lies across and obstructs the guide groove 72 and remains in this position so long as the vehicle wheel presses plate 85 down onto the runway 15.

When the trolley next comes to the stall to remove a vehicle therefrom, the pusher moves into the stall and pushes the retractor 34' ahead of it, with the retractor pin 69 riding in the grooves 70 and 72. As the pusher moves into the stall, pin 69 engages the edge 101 of the shunt plate and moves it laterally against the pressure of spring 97 until the pin reaches the intersection of the groove 72 with the cross groove 75. The pressure of the strong spring 97 then moves the pin 69, and the retractor with it, across the cross groove 75 into the groove 73. The retractor roller is then in front of the right hand rear wheel of the vehicle and engages said wheel to withdraw the vehicle from the stall as the pusher moves backward to the trolley. When the pusher nears its rest position, the pin 69 enters the cross groove 74, passes the frog 76, enters the groove 70 once more, and thereby withdraws the retractor roller from its wheel engaging position over the runway 10. The frog 76, of course, closes the cross groove 74 and prevents accidental movement of the pin 69 directly from the groove 70 into the groove 74.

The retractor 34 is also used, as it moves into and out of a stall, to operate mechanism for locking and holding a vehicle therein. On the left hand runway of the stall, a plate 102 is hinged and is provided on one of its lateral edges with a pin 103 adapted to slide in a cam groove 104 formed in the wide segmental edge of a locking quadrant 105 pivotally mounted on the stall floor. An arm 106 projects radially from the quadrant 105 and is of such length that it can be tripped by a pin 107, projecting laterally downward from an offset 108 formed on the retractor 34', only when the pin 69 reciprocates in the alined grooves 70 and 72.

The arm 106 is normally positioned in the path of the pin 107 by the bumper springs 109 and 110, each of which has one of its ends fixed relatively to the floor of the stall. It will be obvious from the drawings that as the quadrant is moved from one position to another between the springs 109 and 110, the cam groove 105 will cause movement of the pin 103 from the horizontal part 111 of said cam groove to the other horizontal part 112, and vice versa. It will also be apparent that when the pin 103 is in either horizontal portion of the cam groove the plate 102 is locked in position and can be moved only by moving the quadrant 105.

As the retractor 34' moves, with its pin 69 in the grooves 70 and 72, into a stall, the trip pin 107 trips the arm 106, if it be in locking position, and lowers the locking plate 102; and, as the retractor moves out of the stall, with its guide pin 69 still in grooves 72 and 70, its trip pin 107 again trips said arm 106 and raises the plate 102 into locking position. The bumper springs 109 and 110 permit the arm 106 to yield sufficiently to free the trip pin 107, and move the arm in one direction or the other to restore it to tripping positions after the pin 107 shall have passed out of tripping contact therewith. Movement of the retractor into the stall always unlocks the locking mechanism, if it be in locking position during such movement; movement of the retractor out of the stall always moves said mechanism into locking position, unless the retractor has been shunted into vehicle withdrawing position by the plate 79, in which case the trip pin 107 has also been shunted out of the path of arm 106 during the withdrawing movement of the retractor and leaves the said mechanism unlocked.

It will be noted that the guide members 37 are not located centrally of the trolley. The reason for this will be obvious from the fact that the pusher must actually enter into the stall in order to position a vehicle so that its rear end may not project outside the stall. This will also explain the reason for offsetting the roller end of the pusher lever, since the lever must clear the floor of the stall as it projects thereinto.

The curvature of the guide members can be readily determined by plotting the lever in different positions with its roller pivot lying in different positions in the line $x-x$, which is located sufficiently above the runways to ensure proper clearance for the pusher roller and effective driving contact with a vehicle wheel. The method of plotting these curves is set out in detail in my copending United States application Serial Number 24,305 filed April 18, 1925, and need not be further described here.

As previously stated, the pusher mechanism may be installed wherever found necessary or desirable in the system. In Figure 2, for example, a pusher unit is indicated as installed in the ground floor entrance wing to move a vehicle on to a turntable equipped with duplicate pusher units similar to those already described as mounted on the trolley. The retractor and locking mechanisms will obviously be omitted wherever there is nothing more required than the pushing of a vehicle from one location in the system to an adjacent location.

There is nothing particularly novel in the mechanical details of the turntable itself, the novelty residing mainly in the combination of the pusher mechanisms and electrical controlling devices with the turntable to cause it to operate automatically in cooperation with other elements of the system. The turntable structure itself comprises a fixed annular rail 113 adapted to support and guide the rollers 114 journaled in the bearings 115 on the framework 116, to which is secured the worm gear ring 117 in mesh with the worm 118 which is adapted to be rotated by the motor 119 in either direction to cause rotation of the turntable in to positions necessary to effect alinement of the turntable runways with the runways on the trolley or in the wings of the system. The automatic control mechanisms for the turntable will be described in detail hereinafter.

The system as a whole is automatically operated by electric switch mechanism, arranged on the control panel 4. Each stall is provided with a series of contacts electrically connected by suitable wiring, through its own particular relay, to its own particular key-controlled switch on the panel 4, and the vehicle carrying trolley is provided with a corresponding series of circuit makers and breakers to cooperate with said contacts and with motors carried by the trolley to stop the trolley at the stall, operate the vehicle pusher, and start the trolley back to the elevator or to the main entrance, as conditions require.

Each circuit maker and breaker, hereinafter referred to as a contactor, comprises an insulated casing 120 having a bracket 121 fixed to the bottom thereof. A carrier 122, slidable in a guide groove 123 in the bottom 124, is provided at one of its ends with a guide rod 125 slidable through a guide opening 126 in bracket 121 and serves to position a compression spring 127 between said bracket and said end, a pin 128 being fixed to the end of said rod to limit the movement of the carrier by its spring 127.

At its other end, the carrier 122 has an upwardly projecting arm 129 having an insulating block 130 suitably fixed to the top thereof. A pair of lugs 131 project laterally from the said arm, and are provided with apertures 132 to serve as guides for a pair of guide rods 133 connected to the arcuate contact block 134. Compression springs 135 wound around said rods 133 tend to separate the contact block 134 from the arm 129. The contact block 134 is provided with a guide plate 136 which is slidably mounted in a slot 137 formed in the arm 129 and in an offset 138 projecting laterally therefrom, a pin 139 being secured to the free end of the plate 136 to retain and limit the sliding movements of this plate in its slot 137.

A magnet 140 is supported on the under side of the top 141 of the casing 120 to control an armature 142 mounted on an insulating block 143 which is suitably secured to an arm 144 pivotally connected at one of its ends to a contact pivot member 145 carried by the end wall 146 of the casing 120. The arm 144 is curved upwardly to form a stop 147 which bears normally against a roller 148 mounted on the arm 129 immediately below the insulating block 130, and this stop has an offset 149 projecting laterally therefrom and over the insulating block 130 to rest on said block and limit the downward movement of the arm 144 when the magnet is deenergized.

To cooperate with the contactor just described, a contact 150 is secured in an arcuate insulating block 151 mounted in the base 152 which is adapted to be suitably secured to any part of the system wherever found necessary or desirable to operate a contactor of the type described. For example, it may be mounted on the structure framework adjacent a stall to make contact with block 134 of a contactor carried by the trolley. Each contact 150 is connected by its wire 153 to its particular key controlled switch on the control panel 4.

These contactors are designed to control motor operating latch switches of a type peculiar to this system. For the purpose of illustration, one of these switches is shown in Figure 13 as connected up to two contactors to be controlled thereby. The switch comprises an arm 154 pivoted at one of its ends and carrying motor control contacts 155 and 156 at its free end. The arm 154 is normally pressed into inoperative position against a stop 157 by a compression spring 158, and may be drawn into circuit closing operative position by means of an electromagnet 159. An arm 160 projects laterally from the arm 154 and is provided with a projecting shoulder 161 adapted to be engaged by a cooperating shoulder 162 at one end of a latch 163 which is pivoted at its other end and is provided with an armature 164 adapted to be attracted by the electromagnet 165. As shown in Figure 13, the motor switch arm 154 is latched in circuit closing position.

The magnet 140 has its wiring connected at one end by the wire 166 to the pivot end of arm 75

144, and has its other end connected by the wire 167 directly to a spring contact plate 168 fixed on the switch arm 154 and adapted to move with arm 154 into and out of contact with the ground wire 169. Fixed inside the casing 120 are contacts 170 and 171 in such position that they make contact with the offset 149 of the arm 144 only when said arm is pulled up with its armature against the magnet 140. A wire 172 connects contact 171 to the plate 138; a wire 173 connects contact 170 to one end of the electromagnet 165; and a wire 174 connects the other end of the magnet 165 to the wire 167, which, as previously described, leads through the spring contact 168 and wire 169 to ground.

As so far described, the contactor 120 may be considered as controlling the circuit breaking magnet 165 to throw the switch arm 154 out of operation and corresponds to the contactor designated by the reference character F in the wiring diagram of Figure 25. A second contactor, the position of which is merely illustrated diagrammatically in Figure 13, is used to operate the circuit closing magnet 159, and corresponds to that designated by the reference character G in Figure 25. The operation of these contactors is somewhat as follows:—Assuming that the switch 154 is in circuit closing position, as shown in Figure 13, and is held in this position by the latch 163, with the trolley moving toward a stall to move a vehicle thereinto or withdraw one therefrom: then, when the trolley arrives at the stall, the contact 150 forces the contact block 134 inwardly against the pressure of the springs 135 and closes the circuit from the wire 153 through the arm 129, roller 148, and wire 166, magnet 140, wire 167, spring contact plate 168, and wire 169 to ground. This energizes the magnet 140 and causes it to snap up the arm 144 to make the offset thereof contact with the contacts 170 and 171. The springs 135 immediately force the arm 129 under the arm 144, and current then flows from the wire 153 through the wire 172, contact 171, and offset 149, where it splits at the contact 170 to flow through the arm 144, wire 166, magnet 140, wire 167, and spring contact plate 168 to the ground wire 169, and also through contact 170, wire 173, circuit opening magnet 165, and the wire 174 to the wire 167, contact plate 168 and ground wire 169. This energizes both magnets 140 and 165 simultaneously and holds them so energized until the magnet 165 shall have attracted the latch 163 from engagement with the arm 160, thereby permitting the spring 158 to force the switch arm 154 back against the stop 157 into open circuit position. As soon as the arm 154 is released the contact plate 168 separates from the ground wire 169, and the circuits through the magnets 140 and 165 are at once broken. The contactor arm 144 immediately falls away from the contacts 170 and 171 and rests on the insulated block 130 with the offset 149 out of contact with the contacts 170 and 171, the distance between the top of the block 130 and the contacts 170 and 171 being greater than the distance between the bottom of arm 144 and the top of offset 149 in order to provide a gap between said top and contacts when the arm 144 rests on top of the insulated block 130. It will be apparent that, after the contactor and the switch have been once operated and as long as the contact block 134 is in contact with the contact 150, neither of the magnets 140 nor 165 can be again energized until the trolley shall have moved away from the stall and the contact block 134 has again been projected to permit the arm 144 to fall with its offset at rest on the insulated block 130. In other words, when contact is made, the magnet 140 is energized first, then magnets 140 and 165 are energized simultaneously and remain so energized until their common ground connection is broken.

The closing operation of switch 154 is similar to that just described and is effected by a structurally similar connector G. In this case, however, the wire 175, corresponding to the wire 167, is connected directly to the spring contact plate 178 which contacts with the wire 179 when the latch 163 is in raised position, the wire 179 being connected in turn to the ground wire 169. The wire 176, corresponding to the wire 173, is connected to the same spring contact plate 178 through the magnet 159 and wires 177 and 175. When the circuit is closed through the contact plate 134 of the contactor G, current flows first through the wire 175 to the contact plate 178, and thence through wires 179 and 169 to ground, thereby energizing the magnet 140 of contactor G to cause it to snap up the arm 144 against the contacts 170 and 171 of contactor G. Then, with the arm 144 raised as described, current flows simultaneously through magnet 140 of contactor G and the circuit closing magnet 159, through wires 175 and 176, spring contact plate 178, wire 179 and wire 169 to ground, and holds these magnets energized until the magnet 159 draws the switch arm away from its stop 157 sufficiently to permit the latch 163 to fall into locking engagement with the arm 160 and separate the contact plate 178 from the grounded wire 179.

It will be apparent from the foregoing description that when once either the opening or closing circuit operations have been performed by either of the contactors, neither operation can be again performed while the operated contactor is in contact with the contact plate which caused such operations.

The return line in each stall is normally broken, and a magnetic switch MS is located in each stall as soon as the key switch controlling the stall wiring is turned to energizing position, and to cut in the line where it leads to other points and the trolley must make contact on its way to a stall.

This magnetic switch is shown in detail in Figure 15, in which a support 180 is shown as having an armature 181 mounted thereon to swing about a fixed pivot 182 and is held normally against a stop 183 by a spring 184. A magnet 185, supported adjacent said armature, is adapted, when energized, to attract this armature to cause a contact 186 at the free end thereof to move into contact with a contact 187 on the end of the return wire 188. This magnet has its wiring connected at one end to the ground wire 189, and has its other end connected by a wire 190 to the return wire 188. The function of this magnetic switch will be apparent from the illustration thereof in Figure 25, and will be described in detail when the operation of the control mechanism is taken up later for description.

In order to control the stopping of the trolley at any desired stall, each stall is provided with fixed contacts connected by suitable wiring to its particular key operated switch located on the main control panel in a position corresponding to the location of the stall in the system; and the elevator and structure framework are also provided, on each tier, with cooperating contactors and contacts arranged to control the movements of the elevator to and from any desired tier and the movements of the trolley relative to the elevator. The details of each key switch are shown in cross section in Figure 20 as wired up with its cooperating relay and bus bars, and the controlling relation of each switch with respect to all the other switches is set out diagrammatically in Figure 16.

Each key switch includes a brush 191 mounted to rotate over and make contact with contacts 192, 193 and 194 and with the contacts 195 and 196, all fixed on and insulated from the supporting base S. A wire 197 (Fig. 16) leads from the contact 192 to and around the locking magnet LM of a latch switch described above, and to the ground wire 202 as shown. Wire 198 connects the contact plate 193 directly through a signal lamp 199 to the ground wire 202, and a wire 200 similarly connects the contact plate 195 through the signal lamp 201 to the ground wire 202, while the contact plate 196 is connected directly to the return wire 203', and the arcuate lower contact plate 194 is connected by the wire 204 to the return wire 203 to which the wire 203' may be connected.

The rotation and positioning of the brush 191 is effected by an insulated cylindrical carrier 205 (see Fig. 20) to which said brush is secured by a rivet 206. The carrier 205 is fixed to a second cylindrical member 207 to rotate therewith in a shell 208 carried by a casing 209 which is hingedly connected to the supporting base S. A sleeve 210 has one end screwed into the upper part of the shell 208 and serves to support an electromagnet 211. A locking plunger 212 extends through said sleeve and shell and into contact with the member 207 and has fixed to one of its ends a yoke 213 carrying an armature 214 in position to be attracted toward magnet 211 when the latter is energized. A spring 215 interposed between shell 208 and the bottom of yoke 213 keeps the plunger 212 normally raised to ride freely over the periphery of the member 207; and this plunger is adapted, when the member 207 is rotated to bring either of the apertures 216 into alinement with said plunger, to slide into the alined aperture and lock the member 207 to the shell 208.

The key operated part of this switch comprises a series of tumblers 217 mounted to slide in a recess 218 formed in the face of member 207 and normally held by the spring 219 to seat their projections 220 in locking engagement with either of the diametrically opposed recesses 221 formed in the shell 208. A closer plate 222, provided at its center with a keyhole 223, is fixed to the lock member 207 by means of screws 224, and has a handle 225 secured thereto to rotate the members 207 and 205 carrying the brush 191, after the tumbler projections have been released from locking engagement with the recesses 221 in the fixed shell 208.

The handle 225 is not actually necessary to effect rotation of the brush carrier members, which may be rotated by a key alone. This will be apparent from Figure 23, in which the key receiving shank aperture 226 is shown as centered in the member 207, and the tumbler carrying recess 218 so positioned relative to this aperture that, when the key is inserted in the lock and turned fully to the right to depress the tumblers against the pressure of the spring 219, the key blade will be stopped against the sides 227 of the tumblers and further rotation of the key to the right will cause rotation of the brush carrier members and the brush.

In Figure 20, the handle 225 is shown in a position corresponding to non-contact position of the brush 191 as shown in Figure 16; but, in order to illustrate the construction of the brush more clearly, the brush is shown as rotated through a right angle relative to the lock and in contact with the contact plates 194, 195 and 196.

The brush carrier is provided with two diametrically opposed contact plates 233, each long enough to slide under and contact with a pair of magnet contacts 228 and 229 carried by an insulated arm 230 extending from the fixed shell 208. A wire 231 (Fig. 16) connects contact 228 with the ground wire 202, and one pole of the magnet is connected to contact 229, by lead 232 while the other pole thereof is connected to the contact plate 194, which, as previously described, is connected by the wire 204 to the return wire 203.

The locking mechanism so far described is adapted not only to lock the individual key switches, but also, during the operation of any one switch, to lock all the other switches against operation. This interlocking function is clearly set out diagrammatically in Figure 16. In this figure, the brushes 191 of all the key switches are shown horizontal, with all magnets deenergized. A switch is provided to control the interlocking of the switches, and comprises a pivoted bar 232' normally held against a stop 233' by a spring 234 and has a contact 235 at the free end thereof adapted to make contact with the contact 236 when the switch bar 232' is attracted toward the magnet LM by energization of the latter. The bar 232' has a spring contact plate 237 fixed thereto in position to contact with the ground wire 238 when the magnet LM is energized. A releasing contactor R is connected by wire 239 to the spring contact plate 237; and a wire 240, corresponding to the wire 173 of Figure 13, leads through the releasing magnet RM to the wire 239, which, as previously described, is connected to the spring contact plate 237. The operation of this switch will be apparent from the drawings.

A signal lamp 241, preferably colored red, is cut in on the wire 242 leading from the contact 236 to a wire 244 which serves as a common connection for the wires 231 of the key switches S1, S2, etc.

If the brush carrier 205 of any key switch, S1 for example, be rotated clockwise, the contact plate 233 nearest the locking magnet 211 will slide into contact with the contacts 228 and 229, but the magnet 211 will not be energized because the circuit to the ground wire is broken by separation of the contacts 235 and 236. Continued rotation of the brush carries it into contact with the contact plates 192 and 194, thereby energizing the latch switch magnet LM and drawing the contacts 235 and 236 into locked contact. In this position of brush 191, the contact plate 233 is still in contact with the contacts 228 and 229 and the magnet 211 is therefore energized; but, the locking recess or aperture 216 is so positioned relative to the brush 191 and plate 233 that, by the time energization of both magnets LM and 211 is effected, it will have passed beyond locking alinement with the plunger 212, which then merely presses against the unbroken part of member 207.

Energization of the latch magnet LM immediately lights the signal lamp 241, to indicate that some one of the key switches is in operation.

As the brush 191 passes from contact plate 192 to contact plate 193, it closes the circuit through a signal lamp 199, colored blue to indicate that a particular switch is being operated. When the brush is rotated further to make contact with plates 195 and 196, it causes the red lamp 201 to light, and, through the stall return wire 203 connected to plate 196, starts the vehicle carrying trolley on its way to the particular stall controlled by that particular key switch.

The key switch locks used in this system are designed for rotation in one direction only, and the duplicate contact plates 233 and apertures 216 are provided so that a complete operation of a key switch, from insertion to removal of a key, requires a brush rotation of one hundred and eighty degrees only and leaves the contact plates and contact brush positioned for immediate operation as before.

It will be apparent from the drawings that immediately after closing the contacts 235 and 236 by passing the brush 191 over contact plate 192, the magnets of the switches S2 and S3 are deenergized only because the circuits therethrough are broken by reason of their contact plates 233 being out of contact with their contacts 228 and 229. In this condition, it is obvious that if either of these switches S2 or S3 be turned, its plate 233 will move into contact with its contacts 228 and 229, and will thereby energize its locking magnet 211 to cause the plunger 212 to move into the aperture 216 as soon as the two are alined and will immediately lock that switch against further operation.

In order to restore all the key switches to their original unlocked condition, it becomes necessary to separate the contacts 235 and 236 of the locking magnet LM. To effect this separation, the release switch R is provided on the trolley in position to make contact with the contact R1 secured on the framework adjacent the loading point of the system, thereby ensuring release of all key switches only when the trolley is at its loading point. The operation of the releasing magnet RM to effect this separation of the contacts 235 and 236 will be obvious from inspection of the drawings.

Considering the operation of the system as a whole, the movements of the vehicle carrying trolley from the loading point LP (see Figure 25) toward the elevator are, for convenience considered as reverse, and movements of the trolley in the opposite direction are considered forward movements. With this understanding as to directions of movements, and assuming that a vehicle is to be moved from the loading point on the ground floor to a stall in one of the upper floors EF and forward from the elevator, it is evident that contactors and contacts to cooperate therewith must be provided to: (1) move the trolley in reverse from the loading point LP toward the elevator at the ground floor EGF; (2) stop the trolley when it reaches the elevator at location EGF; (3) start the elevator, with its trolley, up to the floor EF; (4) stop the elevator at the floor EF; (5) start the trolley forward from the elevator toward its stall; (6) stop the trolley when it reaches the stall; (7) start the pusher motor to move the vehicle carried by the trolley into its stall, or to withdraw a vehicle from its stall; (8) stop the pusher motor; (9) start the trolley in reverse from the stall toward the elevator; (10) stop the trolley when it returns to the elevator; (11) start the elevator down to the ground floor EGF; (12) stop the elevator when it returns to the ground floor; (13) start the trolley forward from the elevator ground floor toward the loading and discharge point LP; and (14) stop the trolley at its loading point LP and unlock all the key switches.

For convenience of further description and illustration, the several contactors of the type described, and several others of special construction, are designated and referred to by letters corresponding to their particular control functions: for example, the contactor A—is a contactor of special construction used only at the elevator ground floor location to start the elevator up its shaft; B—is a contactor of another peculiar construction used to start the elevator down from any upper floor EF to the ground floor EGF; C—is a passover contact used to prevent stoppage of the elevator at any floor lower than the floor intended to receive the vehicle carrying trolley; F—is a standard contactor of the type illustrated in Figure 13 and used to stop the trolley motor in either direction of movement; G—starts the trolley forward; H—starts the trolley in reverse; L—starts the pusher motor; M—stops the pusher motor and cuts in the contactor H to start the trolley in reverse at the completion of a pusher operation; N—are merely insulated brush contacts fixed wherever found necessary in the system to cut in a contactor which would otherwise be dead.

Several other contactors will be referred to later as occasion for such reference arises.

This explanation of function of the several contactors is given to show the reason for using a peculiar system of relays and bus bar contacts between the key switch panel and the different stalls in order to cut to a minimum the wiring necessary to effect the required movements of the trolley toward and from the different stalls. Each stall of the structure has a controlling key switch on the panel board 4, and between each key switch and its stall there is interposed a relay 245 (Figs. 17 and 18) mounted with a plurality of similar relays, each connected up to its own particular stall and to its particular controlling key switch, on a relay board 246 which has mounted on the back thereof a series of bus bars corresponding in number to the number of operations to be performed under the control of any key switch.

Each relay 245 comprises a steel casing 247 having a brass tube 248 centered therein, with magnet wiring 249 filling the annular space between said casing and tube. A steel plug 250, fixed to the upper end of the tube 248, is provided with a central aperture 251 in which is slidably mounted the stop screw 252 which carries at its lower end the steel armature 253 adapted to slide freely in the tube 248. To the lower end of the casing 247 there is suitably secured, as by screws 254, the fiber insulating block 255 on which the contact springs 256 are securely mounted. The block 255 is provided with an aperture 257 concentric with the tube 248 and large enough to receive the spring 258 which surrounds the steel armature 253 and is confined between the bottom of the steel casing 247 and the top of a fiber insulating block 259 fixed to the lower end of the armature 253 by means of a screw 260 which also clamps a silver ring 261 securely to the bottom of the fiber block 259. Each relay is clamped securely by a strap 262 to a support 263 which is suitably fixed to the relay board 246 so as to leave all the contacts 256 free of obstruction.

When the relay magnet 249 is deenergized, the block 259 is forced by the spring 258 away from the block 257 and carries the silver conducting ring away from the contact ends of the spring contact plates 256 which then rest against the insulating fiber block 259. Energy for energizing the magnet wiring 249 is conducted by the wires 203 and 204 connected to the key switch controlling that particular relay, and a wire connecting wire 203 to one of the contact plates 256 serves to conduct energy through all of the spring plates 256 when the magnet is energized and the silver conducting plate 261 is consequently raised into contact with all of the plates 256 on that particular relay (see Figure 20).

The number of spring contact plates on each relay corresponds to the number of operations to be carried out under the control of the key switch connected to that particular relay, and the bus bars corresponding to the operations to be performed are wired up to be energized by and through any of the spring contact plates on the relay. These bus bars 262', on the back of the relay board 246, are shown in Figure 20 as lettered according to the functions to be performed by the apparatus controlled thereby in accordance with the system of lettering described above for identifying the several contactors and their functions. These bus bars are really the opposite of what are commonly so called; they are more properly distributor bars which distribute the operations of a plurality of key switches on a single contact plate to a single conducting bar connected by a single wire to the contact plate. For example, there might be fifty stalls on one of the upper floors controlled by fifty different key switches. Obviously, there must be a contact plate at this floor on the framework of the elevator to operate a contactor G to send the trolley out to these different stalls. If each key switch were wired directly to its own particular stall, fifty distinct wires would have to be connected up between the key switches and the plate; whereas, with the present construction, each of the key switches is merely connected by a pair of short wires to its relay, and the fifty different relays are each connected to their common bus bar G at the back of the board, from which bar a single wire connected to the contact plate serves to connect said plate operably to any one of the fifty key switches. In a large garage, this saving of wiring is obviously of the utmost importance.

Obviously, there will be as many bus bars as there are total number of operations to be performed under control of the key switches in the system; and the number of spring contacts on each relay will vary according to the number of operations to be carried out under the control of the particular key switch connected to the relay.

For proper operation of systems of the type disclosed herein, it is essential that the trolley carrying elevator stop immediately on arrival at any tier of stalls without any of the usual up and down adjustments heretofore necessary to bring it to an exact position in which the rails 12 and 13 are exactly alined. The elevator driving mechanism disclosed herein and in my copending application for Predetermined stop elevators, Serial Number 96,338, filed March 20, 1926, is designed to cause the elevator to stop exactly at any desired stopping point, as soon as it arrives at that point, without any oscillating preliminary adjustments to cause it to stop at said point.

Referring, now, to Figures 6, 26, 27, 28 and 29: The elevator driving shaft 264, driven by the motor 265, has its axis in alinement with the axis of the driven shaft 266, and has keyed thereonto the driving disk 267 having strikers 268 radially fixed to one face thereof to engage a spring pressed plunger 269 which normally projects into the path of said strikers from the adjacent face of a grooved timing disk 270. This timing disk is fixed to a sleeve 271 mounted to rotate freely on the driving shaft 264 and having one end thereof provided with teeth to form a driving pinion 272 in mesh with a large reduction gear 273 which is fixed on a counter shaft 274 behind and parallel with the driving and driven shafts 264 and 266. A pinion 275 fixed on the shaft 274 meshes with the large gear 276 fixed on the driven shaft 266, thereby completing the reduction drive between shafts 264 and 266, and a driving sprocket 277 is fixed to the shaft to raise and lower the elevator, or at least measure the raisings and lowerings, of the elevator El in its shaft 278.

Keyed to the end of the driven shaft, adjacent the end of the driving shaft 264, is the complementary timing disk 279 having its periphery provided with a rectangular notch 280 of a width to receive the locking rod 281 when this rod is lowered into locking position.

The timing disk 270 has a flange 282 of the same diameter as that of the disk 279, and this flange is cut away at its periphery to form notches 283 and 284, wider than the notch 280 in the disk 279 but of the same depth, spaced apart to form a central lug 285. These notches are also designed to receive the locking rod 281 when there is nothing to prevent the rod falling thereinto.

The rod 281 is mounted parallel to shafts 264 and 266 to rest and slide upon the unbroken peripheries of the timing disks 279 and 282 and to drop into the notch 280 and either of the notches 283 or 284 when either is alined with the notch 280. To maintain the rod 281 in operative relation to the timing disks, it is provided with apertures 286 and 287 slidably receiving guide rods 288 and 289 which extend up from the standards 290 and 291, respectively. The rod 281 is provided with a plate 292 adapted to be attracted by an electro-magnet 293, when the latter is energized, to prevent the rod 281 dropping into alined notches in the timing disks, when it becomes necessary to do so. A conducting contact plate 294 is secured to one end of the rod 281 to serve as a circuit closer for different circuits when the rod is in either raised or lowered position.

The lower face of the rod 281 is provided with a cam member 295 positioned to slide at all times in a deep groove 296 formed in the timing disk 270. When the rod is in its lowered position, by reason of deenergization of the magnet 293 and alinement of notch 280 with either of the notches 283 or 284, the cam member 295 is adapted to engage and withdraw the striker pin 269 from engagement with either of the strikers 268, the pin 269 being provided for this purpose with a notch 296' having one edge thereof adapted to be slidably engaged by either of the cam faces 297 or 298 of the member 295, according to the direction of rotation of the timing disk. This pin 269 is adapted by such engagement to be forced, as the disk 282 rotates slightly, against the pressure of its controlling spring out of engagement with either of the strikers 268.

It will be apparent from the drawings that the disk 282, when the pin 269 and either striker 268 are engaged, is driven at the same speed as the motor shaft 264, and that the shaft 266 carrying the disk 279 necessarily rotates at a different and much slower speed, since it derives its rotation from the shaft 264 through the speed-reducing gearing. In one reduction to practice of my invention, I have selected the elements of this reduction gearing so as to give a reduction in speed of sixteen to one; in other words, I have constructed the mechanism so that the disk 282 rotates sixteen times as fast as the disk 279, and the cooperating notches on these disks can be alined only to permit the dropping of the rod 281 after one complete revolution of the disk 279 and sixteen complete revolutions of the disk 282 from the last position in which the notches in said disks were previously alined under the rod 281.

The whole gearing drive mechanism is designed to form a timing or spacing arrangement whereby the rod 281 can be dropped to disengage the elevator drive gearing from the motor driven disk 267 only at predetermined measured intervals; which, for example, may be the distance or distances from the ground floor to any other floor above it. In my invention as previously reduced to practice, the distances between floors in the elevator shaft are equal and the gearing is designed so that one revolution of the disk 279 and sixteen revolutions of the disk 282 caused the elevator to move from an exact fixed position at one floor to a similar exact fixed position at the next floor, up or down, without requiring any oscillatory adjustment of the elevator past such fixed position.

In order to move the elevator through the desired measured distances between stopping points, it is necessary that some substantially non-stretchable means be used to raise and lower the elevator, or at least to measure the raisings and lowerings thereof. To effect this measuring function, a sprocket wheel 277 is keyed to the shaft 266 and a link chain 299, passing over the usual take-up pulleys (not shown), has its opposite ends connected to the top and bottom of the elevator El to raise and lower the elevator in the usual way. It will be understood that the usual turnbuckles will be provided wherever necessary to effect proper adjustment of the foregoing parts.

It is essential that at least one non-stretchable chain or cable be used in this system to serve as a measuring cable to bring the elevator from a substantially exact position at one floor to a similar exact position at any other floor. Any number of other kinds of cables, whether stretchable or not may be used in addition to the measuring cable, since the cutting off of the motor will be effected by operation of the measuring cable only, and the other cables merely serve as pulling cables so long as the motor is operatively connected thereto.

The mechanical features of the measuring link-cable, sprocket wheels, take-up and counter balancing mechanisms of the elevator form no part of my invention and are therefore not illustrated or described in detail in this application, since these parts can be readily supplied by persons skilled in the art from their knowledge thereof.

Current, either alternating or direct, for the motor 265 is conducted to the motor through the mains 300 and 301 and to the contacts 302 and 303 at the ends thereof, which are adapted to contact with the plate 294 at the end of the rod 281 when the latter is in its raised position; that is, when the said rod either rides on the unbroken parts of the peripheries of the disks 279 and 282, or is held from dropping into alined notches of said disks by the energization of the magnet 293. The motor 265 is of the reversible type, and magnetic latch switches operated by a source of direct current, independent of the motor current, are employed to control the supply of power current to operate the motor 265 in one direction or the other. In this case, it is convenient to consider the lower switch Su as operative to effect upward movement of the elevator El by closing the motor circuit to rotate the motor in the upward operating direction, while the upper switch Sd is considered as the switch for controlling the motor to rotate in the opposite or downward direction. The switch Sd is shown in its normal inoperative position, and the switch Su is shown in operative position to close the circuit through the mains 300 and 301 through one winding of the motor 265. The latch switch Su includes a magnet 304 located adjacent a pivoted contact rod 305 to draw the latter, by energization of the magnet 304, from contact with the stop pin 306 and against the pressure of the spring 307, to make the spring contacts 308 and 309 on the free end of said rod contact with the contacts 310 and 311 at the ends of wires 312 and 313 connected respectively to the feed mains 301 and 300. Wires 314 and 315 from the motor 265 are connected to the contacts 308 and 309, respectively, to control the rotation of the motor 265 in one direction.

In order to hold the rod 305 in contact closing position, after deenergization of the magnet 304, a latch member 316 is fixed thereto and is provided with a notch 317 adapted to receive and hold the projecting end 318 of a pivoted latch 319, which is adapted to be raised from locking position relative to the member 316 by energization of the releasing magnet 320.

The locking magnet 304 has one end of its wiring connected by the wire 321 to the UP contact 322 of the elevator El, and has its other end connected by the wire 323 to a spring contact 324 on the pivoted latch 319, and this spring contact is adapted, when the latch 319 is raised, to contact with a contact 325 on the end of the ground wire 326.

The releasing magnet 320 is connected at one end by the wire 327 to the wire 328, leading from the switch 329 controlling the movements of the elevator to and from the ground floor, and has its other end connected by the wire 330 to the spring contact 331 on the contact rod 305. When the rod 305 is in locked position or the magnet 304 is energized, the contact 331 is in contact with the contact 332 on the end of the ground wire 333. The wiring and mechanism so far described controls the operation of the motor 265 to operate the elevator upwardly in its shaft.

The down switch Sd is identical structurally with the up switch Su, and the parts thereof in the drawings are identified by the same reference characters primed. The wires 334 and 335 connect the other or down winding of the motor 265 with the contacts 308' and 309' to close the down circuit in the mains 300 and 301 (through contacts 310' and 311' on the wires 312' and 313', respectively) when the magnet 304' is energized and the contact rod 305' is drawn into locked position.

Direct current for operation of the several switches is derived from any suitable source of electrical energy, such as the generator B. The wire 336 leads from one terminal of this generator to wiring connected to the switch 329, and the wire 337 grounds the other terminal. A branch wire 338 connects wire 336 to the contact 339 positioned to make contact with the conductor plate 294 when the locking rod 281 is in its lowered position. Another branch wire 340 connects the wire 336 to a brush contact 196 of the key switch K controlling the operation of the switch 329.

Switch 329 comprises the magnet 341, adapted, when energized, to attract the armature 342 on the end of the push rod 343 and to force the conductor plate 344 into contact with the contact terminals on the ends of wires 345, 346, and 347, controlling the up and down movements of the elevator El in its shaft 278.

The push rod 343 has a shoulder 348 adapted to receive the free end of a pivoted latch 349 which locks the conductor plate 344 in its contacting position after it has been drawn into such position by energization of the magnet 341. Immediately above the latch 349 is the releasing magnet 350 having its wiring connected at one end to the latch 349 and its other end grounded. The releasing magnet 350 is energized by current derived from the generator B by the wire 328 connected to the conductor plate 351 set into the shoulder 348, and a tap wire 352 connecting contact 328 with a contact at the free end of wire 352 adapted to make contact with the plate 294 of rod 281 when the latter is in its lowered position. A wire 353 connects the contact plate 194 with the conductor plate 344 to energize the latter, wire 354 connects this plate 194 to the magnet 341, and wire 356 connects the contact terminal 357 with the control wire 345.

The switch A (see Figure 32) controlling the operation of the elevator upwardly from the ground floor, comprises a horizontal support 358 adapted to be fixed to the trolley so that the switch can operate only when the trolley moves into the elevator from the rails 12. The contact 356 is fixed on the framework 359 of the structure at the back of the elevator shaft, and the spring contact plate 322, having a contact 360 at one end, has its other end fixed to said framework with the contacts 356 and 360 normally separated. A push rod 362 is pivoted in the slide 363 slidably mounted in a groove 364 in the support 358, a spring 365, seated in said groove, serving to hold the slide 363 yieldingly against the free end of said support. The rod 362 is normally held in horizontal position against the stop 366 by means of a spring 367, and is limited against downward pivotal movement by said stop.

While the switch A is shown in the wiring diagram of Figure 6 as operating against the side of the elevator, it must be understood that this is merely for convenience in illustration and description. As the trolley moves straight into the elevator from the rails 12 on the ground floor, the rod 362 is horizontal and presses the spring blade 322 inwardly to force the contact 360 against the contact 356, and thereby cause the elevator to rise, as will be described later in this case. As the elevator rises, the rod 362 slides off the plate 322, which springs back to separate the contacts 256 and 360, and the rod 362 is projected by the spring 365 so that when the elevator, with the trolley thereon, moves downwardly in the shaft 278 and approaches the ground floor, the rod 362 merely contacts with the top of the plate 322 and pivots on its slide 363 without moving the contact 360 against the contact 356.

The switch B (see also Figures 30 and 31) controls the downward movement of the elevator from any of the upper floors to the ground floor, and is similarly adapted to be operated only by movement of the trolley from the rails 5 on one of the upper floors on to the rails on the elevator. This switch B comprises a block 367 likewise fixed to the framework 359 back of the elevator shaft, and having an arcuate groove 368 fixed centrally thereof to receive the end of a push rod 369 which is pivotally mounted on a horizontal slide 370 and is held normally horizontal in said slide by means of the spring 371. The slide 370 is held slidably on the trolley by means of the brackets 372 and 373, and has a rod 374 extending from one end thereof, a shoulder 375 being formed where the rod and slide join. The rod 374 slides freely in a fixed bearing plate 376 which forms an abutment for one end of the spring 377, the other end of which abuts against a shoulder 375, a pin 378 on the slide 370 serving to limit the movement of the latter in one direction in the brackets 372 and 373.

The end of rod 374 carries the contact plate 379 adapted to move into contact with contacts 380 and 381 to close the circuit between control wire 345 and wire 321' leading to the closing magnet 304' of the down switch Sd. Each floor above the ground floor is provided with one of these blocks 367, which obviously can effect movement of the plate 379 into contact with contacts 380 and 381 only when the trolley moves straight into the elevator from the rails 12 on any of the floors above the ground floor. As the elevator moves up from the ground floor to any floor above the 2nd floor, or down from any floor above the 2nd, the rod 369 merely swings on its pivot without moving the plate 379 against its contacts 380 and 381.

In order to prevent the rod 281 falling into alined notches on the timing disks 279 and 282 of the elevator drive gearing as the elevator passes a floor on its way up to or down from a floor above the second, the passover contacts C are provided at each floor above the ground floor to cooperate with an ordinary spring pressed contact C' carried by the elevator. The holding of the rod 281 from falling into alined notches 280 and 283 or 284 is effected by energizing one or the other of the magnets 382 and 383, which, when either is energized, attract an armature 384 into contact with contacts 385 and 386 to close the circuit through the wires 387, 388, and magnet 293 to energize the latter and keep rod 281 raised from locking engagement with the notched timing disks 279 and 282.

The function of the several switches and contacts will be better understood from a description of the operation of the elevator, as shown in Figure 6, the elevator is passing the second floor on its way to the fourth floor. However, before any movement of the trolley from its loading point on the ground floor can take place, the key K controlling the particular stall, on the fourth floor in this instance, must be turned to make its brush 191 contact with the contact plates 194 and 196. When this is done, current flows from the source B through wires 336, 340, contact 196, brush 191, wire 354, and through the magnet 341 to ground. Energization of the magnet 341 attracts the armature 342 and moves the conductor plate 344 into contact with the contact terminals of the wires 345, 346, and 347, and permits the latch 349 to engage the shoulder 348 to lock the plate 344 in contact position. Wire 353 connects plate contact 194 to the conductor plate 344 to energize the magnet 341.

When the trolley moves into the elevator at the ground floor, the push rod 362 is in horizontal position and pushes the contact 360 on the spring contact plate 322 into contact with the fixed contact 357. Current then flows from the hot plate 344, through wires 345, 356, contact 357, contact 360, plate 322, wire 321, wire 321' tapped to wire 321, and magnet 383 to ground, thereby attracting armature 384 to close the circuit from source of energy B through wires 336, 387, contact 386, armature 384, contact 385, wire 388, and magnet 293 to ground. Energization of the magnet 293 acts on the plate 292 to lift the rod 281 out of alined locking notches on the timing disks 270 and 279 and causes the conductor plate 294 to rise into contact with the contacts 302 and 303 at the end of the power mains 300 and 301, and thereby render the terminals 310 and 311 hot through the wires 312 and 313 connecting said terminals to said mains. Simultaneously with the energization of the magnet current flows through the wire 321, magnet 304, wire 323, spring contact plate 324, contact 325, and wire 326 to ground. This causes energization of magnet 304 and draws the pivoted switch rod 305 away from its stop 306 to make contacts 308 and 309 contact with the hot terminals 310 and 311. When this happens latch 319 falls away from the contact 325 and its shoulder 318 engages the shoulder 317 on the arm 316 and holds the rod 305 in circuit closing position with the magnet 304 deenergized, because of separation of the contact members 324 and 325. The raising of the rod 281 disengages the cam member 295 from the notch 296 of the plunger 269 and permits the latter to be engaged by one of the strikers 268 on the drive disk 267 to start the drive gearing in action. The switch $Su$ is then in the position shown in Figure 6 and the elevator, with the trolley thereon, starts up. As the elevator rises, the rod 362 releases the spring plate 322 and breaks the circuit through the wire 321, thereby deenergizing the magnets 383 and 293 and permitting the rod 281 to lower and to ride on the unbroken peripheries of the disks 270 and 279.

As the elevator approaches the second floor, the spring contact C' engages the long passover contact C and current then passes from the hot plate 344 through wire 346, contacts C and C', and wires 321'' to the wire 386 and magnet 383 to ground, thereby attracting the armature 384 and energizing the magnet 293 to keep the rod 281 raised while the locking notches 280 and 283 or 284 are alined. The rod 281 is similarly held up by the passover contact C at the third floor as the elevator passes this floor; and, when the elevator arrives at the fourth floor, the dead contact C at this floor leaves the magnets 383 and 293 deenergized. In the diagram of Fig. 6 the contact C on the fourth floor is indicated as dead by omitting the wire from this contact to the plate 344. In actual practice, each of the contacts C will be connected to plate 344 and suitable means will be provided for selectively disconnecting the contact from the plate so as to render the contact at a selected floor dead causing the elevator to stop at such floor. Various means may be employed to disconnect the contact from the plate, such as suitable switches, or a quick detachable connection between each of the contact wires and its associated brush or contact which cooperates with plate 344, as will be readily understood by those skilled in the art. The rod 281, riding on the unbroken peripheries of the disks 270 and 279, drops into the notches alined on said disks as soon as they become alined, the cam member 295 engages the notch 296 in the plunger 269 and withdraws it from engagement with the striker 268 on the drive disk 267, thereby disengaging the motor 265 from the elevator driving gearing. When the dropped plate 294 engages the contact 339 and the contact at the end of the wire 352, current flows from the source of energy B through the wire 338, contact 339 and wire 352 tapped to wire 328, the right hand branch of which conducts current through the conductor plate 351, latch 349, and magnet 350 to ground, thereby energizing said magnet 350 to draw up the latch 349 and permit the spring 389 to force the hot plate 344 away from the contact terminals of the wires 345, 346, and 347. At the same time current flows through the left hand branch of the wire 328, wire 327, magnet 320, wire 330, spring contact plate 331, contact 332, and ground wire 333, thereby raising the latch 319 to release the arm 316 and permit the spring 307 to force the switch rod 305 against its stop 306 in order to disengage the contacts 308 and 309 from the motor terminals 310 and 311 to stop the motor. While the brush 191 of the key K is still in energizing position and the plate 344 therefore immediately returns to contact position; nevertheless, since every contact to the contact C' is broken, the motor switches remain in open circuit position.

After the trolley has moved out from the elevator at the fourth floor and has performed its operation at the particular stall controlled by the key K, it moves back to the elevator with the push rod 369 horizontal to seat in the recess 368 and force the contact plate 379 against the contacts 380 and 381 to cause descent of the elevator. The latch switch $Sd$ is closed by current flowing through wire 345, contact 381, plate 379, contact 380, wire 321', wire 323', spring contact plate 324', contact 325' and ground wire 326', thereby drawing the switch bar 305' with the contacts at the free end thereof into circuit closing position against the motor down terminals 310' and 311' to start the elevator down from the fourth floor. At the same time the wire 321' energizes the magnet 382 to raise the armature 384 and energize the magnet 293 to draw up the plate 294 against the terminals 302 and 303 in order to energize the $Sd$ switch terminals 310 and 311.

The operation of the passover contacts in the downward movements of the elevator is identical with that previously described in connection with the upward movement of the elevator, and will be obvious from inspection of the drawings. When the elevator arrives at the ground floor, the circuit from the wire 356 remains broken, the rod 362 merely resting on top of the spring contact plate 322, the motor 265 becomes disconnected from the elevator driving gearing, and the switch $Sd$ becomes restored to open circuit position through the wire 328 and the wiring connected thereto, as before.

While the key switch K is shown in Figure 6 as connected directly to the elevator control switch, it is to be understood that this is done merely to facilitate disclosure of the invention, and that the operation of the elevator control switch is really effected by connection to the appropriate bus bars connected electrically to the corresponding contacts of the relay controlled by the key switch K.

It will be seen from Figures 26 and 29 that the notches 283 and 284 are each wider than the notch 280; they are made so in order to permit a slight movement of the faster moving disk 279, after the locking plate or rod 281 has dropped into the registering notches, so as to compensate for the slight additional movement of the elevator, after its disconnection from the motor 265, due to the acquired momentum of the moving parts. The width of these notches can be readily determined experimentally so that the elevator may be brought to a stop without snubbing its cable exactly when the rod 281 is seated in the notch 280 and just contacts with one side or the other of the projecting lug 285. It will be understood, of course, that the notches 283 and 284 are provided to take care of the up and down movements of the elevator, respectively.

In automatic storage systems of the type disclosed herein, it is essential not only that the elevator stop in exact predetermined positions at the different floor levels, but also, that the trolley and turntables come to an exact stop, and be locked as so stopped, so that the vehicle runways thereon exactly aline with those of a stall or other members of the system provided with similar runways. It is also essential that means be provided to prevent the simultaneous operation of two motors (such as the trolley and pusher motors on the trolley, or the pusher and turning motors on the turntables) intended to control the movements of two elements which must not be moved simultaneously. Means for providing this exact positioning of relatively movable parts, and to prevent the simultaneous operation of such motors is described and claimed in my copending application Serial Number 47,879 filed August 3, 1925 now Patent No. 1,768,360.

The means referred to above comprises a stop plate 390 (Fig. 7) mounted to slide freely but snugly in the channeled guide member 391 which is pivoted at one end by the pivot 392 to a cross brace 393 forming part of the framework of the trolley T.

The free end of the member 391 is supported by the cross brace 394 to slide freely in a bracket 395 suitably secured to the brace 394 and is normally centered in the bracket 395 by the buffer springs 396 secured between the brackets 397 projecting from and fixed to the cross brace 394.

The stop plate 390 has fixed thereto a T-shaped plate 398 the ends 399 of which serve as abutments for compression springs 400 which press against the cross brace 393 to keep the plate 390 normally projected from the trolley and into locking engagement with a notch 401 in the horizontal flange 402 of the guide rail 12. The plate 390 and the notch 401 are so located on trolley and stall structure, respectively, that the trolley and stall runways are exactly alined when the notch and plate are in locking engagement and the trolley is at rest.

In order to withdraw the plate 390 from locking engagement with the notch 401, the plate is provided at one end with a cross head 403 adapted to be attracted by the electromagnet 404 fixed to the brace 393 and to be held clear of the member 402 when the magnet 404 is energized, as it always is when the trolley motor is in operation to move the trolley in one direction or the other past the stalls. This means that the plate 390 can be in locking engagement with the notch 401 only when the motor 29 is stopped and the trolley is at rest with its runways exactly alined with the stall runways.

The trolley motor 29 is wired through the latch switches Sr and Sf to the mains 405 and 406 to move the trolley on the rails 12 toward and from the elevator El. The motor 29 is wired through the latch switches Sr and Sf to the mains 405 and 406 to move the trolley on its rails 12.

As fully disclosed in my copending application Serial Number 24,305, the motors 29 and 42 are started and stopped by cooperating contact members arranged in predetermined locations on the relatively movable parts of the system: (1) to start the trolley motor 29 to move the trolley toward any desired stall; (2) to stop the trolley motor as soon as the trolley arrives at said stall; (3) to start the pusher motor 42, immediately after the stopping of the trolley motor, in vehicle transferring movement from the trolley to the stall or from the stall to the trolley; and (4) to again start the trolley motor, immediately after the completion of the pusher operation, to move the trolley from the stall back to the loading station. Obviously, then, the pusher and trolley motors must not both be in operation at the same time.

As shown in Figure 7, the trolley motor 29 is connected for "forward" operation by the wires 407 and 408 to the terminals 409 and 410, respectively, adapted to contact with contacts 411 and 412, respectively, on the switch bar 413 when latter is drawn over to contact position by energization of the latching magnet 414. This magnet 414 is controlled by a contactor G (not shown in this figure, but shown in Figure 25) to move said switch bar 413, and a second switch bar 415 connected thereto, against the pressure of the spring 416 into circuit closing position. The bar 415 has its free end provided with the contacts 417 and 418 adapted to be moved into contact with terminals 419 and 420, respectively, of the wires 421 and 422 connected, respectively, to the wires 423 and 424 leading from the magnet 404. A link 425 is pivoted to each of the bars 413 and 415 to cause said bar 415 to move with bar 413 as the latter is moved by its controlling magnet 414 or the spring 416 and to effect the simultaneous closing of the circuits to the motor 29 and the magnet 404. A wire 426 connects the alternate contacts 411 and 418 to the main 406, and a wire 427 connects the remaining alternate contacts 412 and 417 to the other main 405.

The releasing magnet 428 of the switch Sf is controlled by the contactor F through the wires 429 and 430 in exactly the same manner as the magnet 165 is controlled by the layout shown in Figure 13; and this contactor F is also used to control the releasing magnet 431 of the switch Sr through the wires 432 and 433. This means that the contactor F controls the stopping of the trolley motor 29 in either direction of movement. The switches Sf and Sr are structurally identical and the operation of the switch Sr will be obvious from Figure 7 in which both switches are laid out symmetrically with the motor 29. As so far described, it will be obvious that when either the reverse or forward switch is in latched circuit closing position, the electromagnet 404 is energized and the locking stop member 390 is held out of contact with the member 402. In other words, while the trolley is moving toward or from a stall with either of its switches Sf or Sr latched, the stop member 390 is held retracted by the electromagnet 404. However, as the trolley approaches the stopping point, at a stall for example, the contactor F engages the hot contact plate fixed at the stall and operates the releasing magnet to stop the trolley motor and, incidentally, to deenergize the magnet 404. This deenergization of the magnet 404 permits the stop member 390 to project into engagement with the notch 401 and to lock the trolley to the stall with the runways of the stall and trolley alined, providing the trolley stops of itself after stopping of its motor exactly in the desired position. The momentum of the trolley, after the stopping of the trolley motor, will usually carry it past the stopping position; so that it becomes necessary to start the trolley motor again to bring the trolley back to the exact stopping position.

In order to effect this necessary exact alinement of the trolley and stall, the stop member has fixed thereon a spring contact blade 434 centrally located between the contacts 435 and 436 fixed on the bracket 395 and spaced slightly apart from said blade. A wire 437 connects the blade 434 to the wires 438 and 439 connected to the main 405 and to the switch bars 440 and 441, respectively. A wire 442 connects the contact 436, through the "forward" magnet M*f*, to the wire 443 and the main 406, and to the switch bar 444 which is connected by an insulated pivoted link 445 to the bar 440, so that both switch bars are normally held, by the spring 446 against the stop 447, in open circuit position relative to the contact terminals 449 and 450. Particular attention is directed to the fact that the contact 449 is connected to the wire 408 of the motor 29 and to the wire 422 connected in turn to the wire 424 of the electromagnet 404; and that the contact 450 is connected to the wire 407 of the motor 29 and to the wire 421 connected in turn to the wire 423 of the magnet 404. This means that when the magnet M*f* is energized and the pivoted switch bars 440 and 444 are in circuit closing position, the magnet 404 is also energized and the motor 29 is in forward operation.

The contact 435 is connected by the wire 451 through the reverse magnet M*r*, to the wire 452 and to the main 406 and to the pivoted switch bar 453, which is in turn connected by the insulated link 454 to the bar 441, so that both bars are normally held in open circuit position by the spring 456 with the bar 441 against the stop 455 and away from the contact terminals of the wires 457 and 458. Particular attention is likewise directed to the fact that the wire 457 is connected to the wire 459 on the reverse side of the motor 29 and to the wire 421 which is connected in turn to the wire 423 of the electromagnet 404; and that wire 458 is connected to the wire 460 on the reverse side of the motor 29 and to the wire 422 leading to the wire 424 of the magnet 404. This means that when the magnet M*r* is energized and the bars 441 and 453 are in circuit closing position, the magnet 404 is also energized and the motor 29 is in reverse operation.

From the foregoing description, it will be obvious that every time the trolley motor 29 is operated, whether by either of the switches S*f* or S*r* or by the switches controlled by the magnets M*f* or M*r*, the magnet 404 is energized and the stop member 390 is held withdrawn from locking engagement with the notch 401 in the member 402.

It is not only essential that the member 390 be held from locking engagement with the member 402 during the operation of the trolley motor 29, but it is also essential that the pusher motor 42 be withheld from operation during any operation of the trolley motor 29. To effect this prevention of simultaneous operation of the two motors, the channel member 391 (Fig. 7) has fixed thereto a bracket 461 on which is secured a contact 462 connected by the wire 463 through the magnet 464 to the terminal 465 of the pusher switch. An arm 467 fixed to the plate 398, which is fixed to the stop member 390, has a contact 468 adapted to contact with the contact 462 when the member 390 is projected by the springs 400; that is, whenever the magnet 404 is deenergized. A wire 469 connects the contact 468 directly with the main 405.

The pusher motor switch bar 466 is operated by the latch magnet 470 under the control of the contactor L (see Fig. 25) through the wires 471 and 472, and by the releasing magnet 473 under control of the contactor M (see also Figure 25) through the wires 474, 475, 476, and 477, against the pressure of the usual spring 478, which normally holds the bar 466 in open circuit position against the stop 479. The contacts 480 and 481 are connected to the mains 405 and 406 by the wires 482 and 483, respectively, and are adapted to make contact when the magnet 470 is energized with the fixed terminals of wires 465 and 484. The circuit of the pusher motor 42 is closed, only when the magnet 464 (Fig. 7) is energized, by the pivoted switch bars 484 and 485, connected to pivot simultaneously, by means of the link 486 and normally held in open circuit position against the stop 487 by means of the spring 488.

It will thus be apparent from Figure 7 that, even when the main pusher switch bar is in circuit closing position, the circuit from the mains to the motor 42 is always broken when the magnet 464 is deenergized, which deenergization can occur only when the electromagnet 404 is energized; that is, whenever the trolley motor is in operation in either direction. It will also be apparent that the pusher motor cannot operate unless the contacts 462 and 468 are in contact to energize the magnet 464; that is, when the trolley motor is at rest and the stop member 390 is fully seated in its locking notch 401.

In operation: assuming the trolley approaches a stall at which a vehicle transfer is to take place and is under control of the forward switch S*f*, the trolley carried contact F (Fig. 25) engages the hot plate 150 and immediately operates the release magnet 428 (Fig. 7) to stop the motor 29 and to deenergize the magnet 404. The stop member 390 then seats in its notch 401; and, if the trolley stopped instantly in this position, the pusher motor would immediately set up in operation through the energization of the contactor L (see Figure 25). The inertia of the trolley, however, will usually carry it beyond the stop position, and the member 390 seated in the notch 401 will cause the guide channel 391 to swing about its pivot 392 and to contact with one or the other of the contacts 435 or 436, which will immediately energize magnet M*f* or M*r*, as the case may be, to operate the trolley motor, withdraw member 390, and cut out the pusher motor by separating contacts 462 and 468. This will result in a to and fro oscillation of the trolley motor past its stopping point, which will continue with diminishing amplitude until the trolley finally comes to rest with the member 390 in locking engagement in its notch 401 and with the pusher motor 42 in operation.

The micrometer stop is not adapted for use in the elevator of this system. It is used, however, between the trolley and the fixed framework of the structure, and between the turntables and said structure, to cause alinement between the runways on the different fixed and movable bodies. To avoid confusion in the drawings, no attempt is made in this case to illustrate this stop mechanism in detail as combined with the other movable parts of the system; the position of the stop member 390 is merely indicated in Figure 4, with the understanding that any mechanic skilled in the art will be able, from his knowledge of the art, to mount the stop mechanism wherever found necessary or desirable in the system.

For an understanding of the operation of the system as a whole, reference is had to Figure 25. For clearness of illustration and description, the micrometer stop mechanism and the controlling switches therefor are omitted; but, for such parts as are common to the two figures (Figs. 7 and 25) of the drawings, the same reference characters are used. Assuming that the trolley has moved forward from the elevator at the floor EF, and has just reached its stall with the forward trolley motor switch latched, the contact block 134 (Fig. 13) of the contactor F slides over the "hot" contact plate 150 and closes the circuit from the main wire 406 through wire 489, contact 490, wire 429, contactor F, plate 134, and wire 153 to the return wire 491, and at the same time energizes the magnet 428 through the wire 492 tapped to the wire 429, wire 430, contactor F, and wire 153 to the return wire 491, thereby operating the release magnet 428 to cause the switch bar 413, with its contacts 411 and 412, to swing away from the terminals 409 and 410 to stop the trolley motor.

The contactor L then operates the latching magnet 470 of the pusher switch bar 466, through the wires 471 and 472, to swing the contacts 480 and 481 against the pusher motor terminals and to latch the bar 466 in the circuit closing position shown in Figure 7, thereby starting the pusher motor 42. As the pusher chain 46 moves around its sprocket wheels 44 and 47 (Fig. 4), the contact cam 63 moves with it and, near the end of the pusher movement, moves around the sprocket wheel 47 to contact with and depress the contact arm 493, against the tension of the spring 494, into contact with the contact block 134 of the contactor M. Two things then happen: (1) the locking magnet 495 of the trolley motor's reverse latch switch 496 is energized through the wire 476, brush N, and wires 497 and 498, thereby starting the trolley in reverse to the elevator; and (2) the release magnet 473 is operated to stop the pusher motor.

When the trolley reaches the elevator at the floor level EF, the contactor F operates again to throw the reverse switch Sr, through the releasing magnet 431, and stop the trolley motor. The switch B then operates to send the elevator down, and the passover contacts C (see also Fig. 6) prevent the stopping of the elevator at all floors between the floor EF and the ground floor EGF. The absence of a passover switch C at the ground floor level EGF causes the elevator motor to stop, and the contactor G then sends the trolley forward to the loading point LP, where the contactor F stops the trolley motor and the contactor R operates the releasing magnet RM (see Figure 16) to release all the key switch mechanism on the switch panel 4.

The starting of the trolley from the loading point LP to any stall involves nothing more than a reversal of the operations just described. The hand switch 499 at the loading point is provided merely to give control of the operation of the system to an attendant when desired. Obviously, this switch may be omitted altogether or left closed without affecting the automatic operation of the system from the key controlled switchboard. It is intended, too, that manually controlled switches may be interposed anywhere in the wiring system, in order to give independent control of the various moving members of the system in case it is ever found necessary or desirable to operate these members independently. When the key K is turned and the hand switch 499 is closed, and the trolley is at the loading point LP, the contactor F starts the trolley motor 29 in reverse and sends the trolley toward the elevator at the ground floor level EGF. When the trolley arrives at the elevator ground floor, the contactor F stops the trolley motor; the switch A sends the trolley and elevator up the elevator shaft to the floor EF, and the passover contacts C at the floors between the ground floor and the floor EF prevent stopping of the elevator at any intermediate floor. A dead passover at the floor EF causes the elevator to stop at that floor and the contactor G starts the trolley motor to send the trolley forward to its stall.

The system so far described would be complete as an automatically operative system if the vehicles were loaded directly onto the trolley at the loading point LP and were discharged from the trolley at this point. Where, however, the system includes turntables, as it does in this case, at entrance and exit alleys, it must include some means operable by the presence of a vehicle to determine whether the trolley pusher mechanism will operate when the trolley arrives at the loading point after a trip to a stall. Obviously the trolley pusher mechanism should not operate when the trolley returns to the loading point empty, and should operate when it returns to the loading point with a vehicle to be discharged. A special switch plate 500 (see Figures 4 and 34), operated by the pressure of a vehicle wheel, is pivoted in a slot 501 in the runway 10 and is held normally projected above this runway by a spring 502 and in the path of a vehicle wheel. The plate 500 is provided on its free lower edge with a conductor plate 503 adapted to contact with the contacts 504 and 505 at the ends of the wires 506 and 507 tapped onto the wires 471 and 472 which control the operation of the pusher motor 42 (see Figure 4).

The wire 506 is connected to a contact 508 fixed on the side of the trolley and a cooperating contact 509 is fixed on the framework of the structure in the path of the contact 508 as the trolley moves to its rest position at the loading station LP. The contacts 508 and 509 are spaced apart and are mounted to make electrical connection only through the agency of a bell crank 510 which is pivotally mounted on the bracket 511 fixed to said framework and which has its arm 512 positioned to engage the contact 508 as the trolley moves past contact 509 to its rest position at the loading point. When the trolley moves in the direction of the arrow (Figure 35) its contact 508 engages the arm 512 and rotates the bell crank 510 to make the arm 513 contact with the spring contact blade 509 to close the circuit from the main 405 through the wires 506 and 507 to the trolley pusher switch. As the trolley moves past the bell crank 510 and out of contact therewith, the bell crank assumes its original position and the circuit to the pusher motor is broken. The parts of this switch mechanism are so designed that the trolley can move the arm 513 against the contact plate 509 only when the trolley is in movement toward its stopping point at the loading station LP, movement of the trolley in the opposite direction merely swinging the bell crank about its pivot to rotate the arm 513 away from the contact plate 509. It will be apparent from the foregoing description that as the trolley returns from a trip to a stall, its pusher mechanism will operate only when there is a vehicle on its runways having a wheel pressing the plate 500 down to contact with the contacts 504 and 505 and only when the trolley shall have arrived at its loading and discharging point LP.

The turning of the turntables may likewise be controlled by the operation of a pusher as it moves a vehicle onto the turntable. The switch mechanism for doing this is illustrated in Figure 33, in which there is shown a switch blade 514 pivoted eccentrically in the framework between the trolley and the exit turntable at the loading and discharge point LP and in the path of the trolley pusher 32 as it moves over onto the turntable runway to discharge a vehicle thereonto. The blade 514 is held normally vertical by a spring 515 and has a contact 516 adapted to be pressed, by the return of the pusher only onto its trolley, against the spring contact 517 which is connected by the wire 518 to the contact 519 fixed to the structure framework and adapted to make contact with contact 520 fixed to the turntable framework, a hot wire 521 from the appropriate relay bus bar being connected to the switch blade 514. On the trolley runway there is pivoted a blade 522 held normally vertical by a spring 523 and adapted to be pressed down by a vehicle wheel to move the spring contact 524 into contact with the fixed contact 525 and thereby close the circuit through the wires 526 and 527 to operate a switch of the usual type to control the rotation of the turntable motor 119. Suitable contacts may be arranged between the fixed framework and turntable framework to stop the turntable after each ninety degree rotation.

This system as a whole is designed, after manual operation of a key switch corresponding to any desired stall, to effect the automatic transfer of a vehicle from the entrance aisle 1, through the entrance turntable, trolley, elevator and trolley runways, to said stall; and to effect the automatic transfer of a vehicle from any desired stall, through the trolley, elevator, and exit turntable, onto the exit aisle 2. Since the stalls are disposed on opposite sides of the trolley areaway, and since it is desirable to discharge the vehicles into the exit aisle with their front ends facing the front of the storage structure, it is necessary to establish a storage system and to provide cooperating mechanisms between the turntable and trolley pusher mechanisms to obtain this desired result.

These mechanisms are set in successive operation to: (1) Operate the pusher mechanism in the entrance aisle 1 to push a vehicle onto the entrance turntable; (2) rotate the said turntable anti-clockwise or clockwise so that when a vehicle is pushed from the turntable onto the trolley, the vehicle will be positioned on the trolley to be pushed front end foremost into its stall when the trolley arrives at the stall; (3) operate the turntable pusher at the completion of its turning movement to push a vehicle therefrom onto the trolley; and (4) start the trolley away from the loading and discharge point LP as soon as the vehicle has been positioned thereon and the turntable pusher has completed its pusher operation. On the return of the trolley from a stall with a vehicle, said mechanisms include cooperating means which operate automatically after the trolley has reached its rest position at the point LP to: (1) Push a vehicle from the trolley onto the exit turntable; (2) rotate the exit turntable in a direction to cause the front of the vehicle to face the front of the structure; and (3) operate the exit turntable pusher mechanism to discharge the vehicle onto the exit aisle 2. Since these mechanisms are of broad general application and are not limited in any way to use with the elevator and storage stall structures disclosed herein, their specific structural details are not disclosed herein.

Instead of the scotches previously referred to for holding the vehicle positioned on the trolley, I may employ an automatically operable pair of stop plates to perform this function. Each stop plate 528 (Figs. 4 and 5) is arranged in slot 501 of the trolley runway to project into the path of the vehicle wheel W of a vehicle as it is moved onto the trolley. This plate 528 is pivoted to a bracket 529 which is fixed to a spring controlled supporting bar 530 mounted to rotate about a pivot 531 on the trolley framework immediately above the trolley pusher chain 57 where it passes over the pulley 51. The chain 57 has fixed thereto a plate 532 adapted to contact with the bar 530 and hold it elevated, as shown in Figure 4, when the pusher is at rest in its recess 48. A spring 533 connected to the bar 530 and to the trolley framework pulls the bar 530 against the stop 534 when the plate 532 is removed from supporting and elevating contact with the bar 530. The plate 528 is provided with an offset 535 adapted to engage a stop 536 on the bracket 529 to prevent rotation of the plate 528 anti-clockwise as shown in the drawings, and has a recess 537 receiving the free end of a spring 538 fixed on the bar 530 to hold said offset 535 in yielding engagement with the stop 536. A stop 539 limits the upward movement of the bar 530 against the tension of the spring 533.

It will be apparent from the drawings that when the trolley pusher is at rest, the stop plate 528 will project from the runway 10 to stop a vehicle moved onto the runway by some other pusher. As soon as the trolley pusher is started in operation the pusher chain 57 immediately moves the plate 532 from under the bar 530 and permits the latter to fall against the stop 534 and to carry with it the stop plate 528 out of the path of the vehicle wheel W. The parts of this stop mechanism are so designed and located that the plate 528 falls below the top of the runway 10 as soon as the pusher roller 32 has risen out of its recess 48 into pushing contact with the adjacent vehicle wheel. Since both trolley runways are provided with these stop mechanisms it is necessary to provide the plates with the springs 538 in order to permit the wheels of vehicles moving onto the trolley to depress the plates 528, by engagement with the backs thereof, below the runways and to permit the movement of vehicles onto the trolley. It will be apparent, too, that after a vehicle has been positioned on a trolley, these stop plates 528 stand projected in the paths of diagonally opposite wheels of the vehicle, and prevent movement of the vehicle in either direction, until one or the other of the trolley pushers shall have started in vehicle pushing operation.

The system described is wholly automatic in operation after it has been started in operation by actuation of any of the manually controlled key-controlled switches, is independent of gravity for its vehicle transferring operations, and effects a very great saving in storage space and the time required to store vehicles securely.

I claim:

1. In a vehicle storage structure, a vehicle storage stall, a vehicle carrier alined with said stall and having means thereon for drawing a vehicle from said stall onto the carrier, and means controlled by a vehicle in the stall to control the operation of the first named means.

2. In a vehicle storage structure, a stall, a vehicle carrier alined with said stall and having means thereon for pushing a vehicle from said carrier into said stall, and means connected to said vehicle pushing means for drawing a vehicle from the stall onto the carrier.

3. In a vehicle storage structure, a stall, a vehicle carrier adapted to be alined with said stall, means on said carrier to push a vehicle from the carrier into the stall when the carrier and stall are alined, means pivotally connected to said pushing means for drawing a vehicle from the stall when the carrier and stall are alined, and cooperating means on the carrier and stall and operable by a vehicle stored in the stall to swing the pivoted means into withdrawing engagement with the stored vehicle.

4. In a vehicle storage structure; a stall; a vehicle carrier adapted to be alined with said stall; and vehicle moving mechanism on said carrier reciprocable over the carrier and partly into said stall for pushing a vehicle from the carrier into the stall when the stall is unoccupied and for withdrawing a stored vehicle from the stall onto the carrier, alternately.

5. In a vehicle storage structure a stall; a vehicle carrier adapted to be alined with said stall; and mechanism, on the carrier and in the stall, controlled by a vehicle stored in the stall for drawing the stored vehicle out from the stall and onto the carrier.

6. In a vehicle storage structure, a stall having vehicle receiving runways therein, a vehicle carrier having runways adapted to be alined with the stall runways, vehicle moving mechanism mounted on said carrier and including a pusher member reciprocable over alined carrier and stall runways, a vehicle puller connected to said member, and means controlled by a vehicle stored in said stall to guide said puller over said alined runways in one direction only.

7. In a vehicle storage structure, a stall, a vehicle carrier adapted to be alined with said stall, mechanism on said carrier for pushing a vehicle from the carrier onto the stall when the carrier and stall are alined, means in said stall for locking a vehicle therein, and means connected to said mechanism to operate said locking means for locking a vehicle in said stall only after a vehicle has been moved into said stall by said mechanism.

8. In a vehicle storage structure, a stall, means outside said stall for pushing a vehicle into the stall, and means in said stall and operable independently of gravity for locking a vehicle in said stall.

9. In a vehicle storage structure, a stall, a vehicle carrier adapted to be alined with said stall, vehicle moving means on said carrier reciprocable into and out of said stall, vehicle locking means in said stall, and means connected to said moving means for operating said locking means as the said moving means moves out of said stall only.

10. In a vehicle storage structure, a stall, means outside said stall for pushing a vehicle thereinto, and means to prevent the operation of said pushing means unless a vehicle is positioned properly to be pushed by said pushing means into said stall.

11. In a vehicle storage structure; a stall; vehicle locking mechanism therein; means outside said stall and reciprocable thereinto and out from to move a vehicle into said stall; and means connected to said vehicle moving means for operating said locking mechanism, after the vehicle has been moved to stored position in said stall, to lock the stored vehicle in said stall.

12. In a vehicle storage structure; a stall; vehicle locking mechanism in said stall; vehicle pusher mechanism outside said stall and having a part movable into and out of said stall; and means connected to said part and operable only by the movement of said part out from said stall to move said mechanism into vehicle locking position.

13. In a vehicle storage structure; a stall; vehicle locking mechanism in said stall; vehicle moving mechanism outside said stall and having a part movable into and out of said stall; and means connected to said part and operable by the movement of said part into said stall to release said mechanism from vehicle locking position and operable only by the movement of said part out of said stall to operate said mechanism into vehicle locking position.

14. In a vehicle storage structure, a stall having vehicle wheel guiding runways therein, a vehicle carrier having similar runways thereon, means for moving said carrier to said stall, means on said carrier for locking the carrier to said stall with the runways on said carrier and in said stall alined, means on said carrier for moving a vehicle from the carrier runways on to the stall runways and means on said carrier to prevent the operation of said vehicle moving means before the carrier is locked to said stall.

15. In a vehicle storage structure, a stall having vehicle wheel guiding runways therein, a vehicle carrier having similar runways thereon, means for moving said carrier to and from said stall, means for locking said carrier to said stall with the runways of the stall and carrier alined, means for pushing a vehicle from the carrier runways onto the stall runways when the carrier is locked to said stall, and means connected to said pushing and locking means to release the latter after completion of the pusher operation.

16. In a vehicle storage structure, a stall having wheel guiding runways therein, a vehicle carrier having similar runways thereon, means for moving said carrier to and from said stall, means for locking said carrier to said stall with the stall and carrier runways alined, pusher mechanism on said carrier and having a part thereof engageable with the wheel of a vehicle to push the vehicle from the carrier runways onto the stall runways, a retractor pivoted to said part and movable therewith, means on said carrier and stall to guide said retractor in a predetermined path during the operation of the pusher mechanism to move a vehicle from the carrier runways onto the stall runways.

17. In a vehicle storage structure, a stall having wheel guiding runways therein, a vehicle carrier having similar runways thereon, means for locking said carrier to said stall with the runways of stall and carrier alined, mechanism on said carrier having a part adapted to be moved into and out of said stall to withdraw therefrom a vehicle stored therein, means on said carrier and stall for guiding said part clear of the stored vehicle during the movement of said part into said stall, means on said stall for moving said part into contact with the stored vehicle at the end of the inward movement of said part, and guiding means for retaining said part in withdrawing contact with said vehicle during the movement of said part out from said stall.

18. The combination with the apparatus set forth in claim 17, of means for shunting said part from withdrawing contact with said vehicle at the termination of said withdrawing operation.

19. The combination with a vehicle storage stall of means outside said stall for pushing a vehicle into the stall when empty and for withdrawing a stored vehicle from said stall, said means including a part engageable with one side of a vehicle wheel during a pushing operation and a part pivoted to the first named part to engage the opposite side of a vehicle wheel during a withdrawing operation, and means for guiding the second named part out of contact with the vehicle wheel during a pushing operation of the first named part.

20. The combination with a vehicle storage stall, of means outside said stall for pushing a vehicle into said stall when empty and for withdrawing a stored vehicle from said stall, said means including a part engageable with one side of a vehicle wheel during a pushing operation and a part engageable with the opposite side of the vehicle wheel during a withdrawing operation, and means for guiding the second named part into contact with said opposite side of said vehicle wheel to effect withdrawal of the vehicle from said stall and to retain said second named part in engagement with said wheel until the completion of the withdrawal operation of said means.

21. The combination with a vehicle storage stall, of means outside said stall for pushing a vehicle into said stall when empty and withdrawing said vehicle from said stall, alternately, and locking mechanism in said stall and operable by said means to lock a vehicle in said stall immediately after a vehicle has been pushed by said means into said stall.

22. The combination with a vehicle storage stall, of means outside said stall for pushing a vehicle into said stall when empty and for withdrawing said vehicle from said stall, alternately, and locking mechanism in said stall operable by said means to lock a vehicle in said stall immediately after being pushed thereinto and also operable by said means to release said vehicle immediately prior to the start of the withdrawal of said vehicle.

23. In a vehicle storage structure, vehicle wheel guiding runways, pusher mechanism below each of said runways and having a part adapted to be moved above said runway into moving contact with a vehicle wheel thereon, and a wheel stop on each runway and connected to said mechanism to be lowered below said runway as said part rises above it and to be raised above said runway during the lowering of said part below it.

24. Vehicle guiding runways parallel to each other, vehicle wheel pushers below said runways at diagonally opposite end thereof, vehicle wheel stops at the remaining diagonally opposite ends of said runways, and normally positioned above said runways, and means for raising said pushers above said runways and for moving them therealong and for lowering said stops below said runways during all movements of the pushers above said runways.

25. In a vehicle storage structure, a vehicle carrier having wheel guiding runways thereon, vehicle pusher mechanism below each runway and having a pusher element normally below one end of said runway, a stop pivoted to the opposite end of said runway and normally held by said mechanism above said runway when the said mechanism is at rest and said element lies in its normal position below the runway, and means for pulling said stop below said runway as soon as the pusher mechanism starts in operation.

26. A vehicle carrier having wheel guiding runways thereon, pusher mechanism below each runway and having a wheel engaging part reciprocable above and along said runway from one end to the other, a stop member at one end of said runway, means for holding said member normally below said runway, and means on said mechanism to raise said member above said runway at termination of each reciprocation of said part.

27. In a vehicle storage structure, an elevator shaft, an elevator movable up from a fixed position in said shaft to any one of a plurality of higher predetermined stopping positions, a vehicle carrier movable into and out of said elevator, means operable by the movement of said carrier into said elevator at said fixed position to start the elevator upward in said shaft; and means operable by the movement of said carrier into said elevator at one of said predetermined stopping positions for starting the elevator moving downward in said shaft.

28. A vehicle storage structure divided into a plurality of floors, an elevator, means for moving the elevator from the ground floor to any of the other floors, a vehicle carrier movable into and out of said elevator, means operable by the movement of the carrier into the elevator at the ground floor for starting the elevator upwardly, means for stopping the elevator at each floor, means to prevent the operation of said stopping means except at a predetermined floor, means for moving the carrier out of said elevator when it arrives at said predetermined floor, and means operable by the return of the carrier at said predetermined floor to start the elevator down to the ground floor.

29. In a vehicle storage structure, an elevator shaft, an elevator movable up and down in said shaft, a vehicle carrier movable into and out of said elevator at different floor levels in said shaft, means operable by the movement of said carrier into said elevator at the lowest of said floor levels for moving the elevator up in said shaft, and means operable by the movement of said carrier into said elevator at any of the upper floor levels to move the elevator from said level to said lowest floor level.

30. In a vehicle transferring system, a plurality of relatively movable vehicle carriers having vehicle runways thereon and vehicle pushers operable over said runways, and means operable only when the runways of said carriers are alined and controlled by the weight of a vehicle on one of said carriers to transfer a vehicle from one carrier to the other.

31. In a vehicle transferring and storage system, a plurality of relatively movable vehicle carriers, and means on one of said carriers and controlled by the vehicle transferring movements of the other carrier to set the first named carrier in movement.

32. In a vehicle transferring and storage system, a plurality of relatively movable vehicle carriers having vehicle runways thereon and vehicle pushers operable over said runways, means on one of said carriers and controlled by the weight of a vehicle thereon to determine the operation of its pusher in transferring said vehicle on to the runways of the other carrier, and means controlled by the return movement of said pusher to its carrier to set the other carrier in movement.

33. In a vehicle transfer system, a turntable having vehicle runways thereon and means for locking it in predetermined positions relative to the fixed framework of the system, a vehicle carrier having similar runways and movable in the system toward and from said turntable, means for locking said carrier to the framework with its runways alined with the runways of the turntable, and means on said carrier controlled by the weight of a vehicle on its runways to transfer said vehicle from the carrier runways on to the turntable runways.

34. In a vehicle storage system, fixed framework, a turntable rotatable about a fixed center therein, means for rotating said turntable from one predetermined position to another relative to said framework, a vehicle carrier movable toward and from said turntable, means for locking said carrier to said framework in a predetermined position relative to the turntable, and means operable only when the carrier and turntable are locked to said framework for pushing a vehicle from the carrier to said turntable.

35. In a vehicle storage system, fixed framework having vehicle guiding runways fixed thereto, pusher mechanism below said runways having a part movable above said runways to engage a vehicle wheel and move the vehicle from said runways, a vehicle carrier having similar runways thereon and movable relative to said framework to and from a position in which its runways are alined with the first named runways, means for locking the carrier in such position, and means pivoted in said framework between the two sets of runways and operable by said part as it moves across alined runways to move said carrier from said position.

36. In a vehicle storage system, fixed framework, contact plates fixed in predetermined positions on said framework, a vehicle carrier movable in said framework, contactors mounted on said carrier in positions to cooperate and make contact with said plates, and cooperating motors on said carrier adapted to be operated by contact of said contactors with said plates.

37. In a vehicle storage system having movable vehicle carriers therein, a motor controlling the movements of each carrier, a pivoted switch bar controlling the energizing circuit to said motor, means for holding said bar in normally open-circuit position, means for moving said bar to circuit-closing position, and a latch independent of said moving means to hold said bar in circuit closing position after completion of the operation of said moving means.

38. In a vehicle storage system having movable elements therein, a motor controlling the movements of each element, a pivoted switch bar controlling the energizing circuit to said motor, means normally holding said bar in open circuit position, an electro-magnet operable, when energized, to move said bar into circuit closing position, and a latch engageable with said bar to hold it in circuit closing position after movement thereto by energization of said magnet and after de-energization thereof.

39. In a vehicle storage system having movable elements therein, a motor controlling the movements of each element, a pivoted switch controlling the energizing circuit to said motor, means for normally holding said switch in open-circuit position, a magnet energizable to move said switch into circuit-closing position, and a latch movable into engagement with said switch to hold it in circuit closing position after movement thereto by said magnet, the movement of said latch into engagement with said switch breaking the energizing circuit through the said magnet.

40. In a vehicle storage system having movable elements therein, a motor controlling the movements of each element, a pivoted switch controlling the energizing circuit to said motor, yielding means normally holding said switch in open-circuit position, a magnet energizable to move said switch into circuit-closing position, a latch movable into engagement with said switch to hold it in circuit-closing position after movement thereto by said magnet, the engaging movement of said latch and switch breaking the circuit through said magnet, and a second magnet operable to move said latch out of holding engagement with said switch, the circuit through said second magnet being broken by the disengaging movement of said latch.

41. A motor, a pivoted latch switch therefor, means normally holding said switch in open-circuit position, electromagnets controlling the movements of said switch to and from circuit closing positions, a second switch controlling the energization of one of said magnets, a third switch controlling the energization of the other magnet, the last named switches and magnets being interwired so that movement of the motor switch by either magnet breaks the circuit through that magnet and closes it through the other.

42. In a vehicle storage structure, a vehicle carrier having vehicle wheel guiding runways thereon, means for moving the carrier into proximity of a vehicle, vehicle engaging mechanism extensibly mounted on said carrier, means for extending said mechanism to engage a portion of the vehicle, and means for then operating said vehicle engaging mechanism to roll the vehicle along said runways onto said carrier.

43. In a vehicle storage structure, a vehicle carrier having vehicle wheel guiding runways thereon, means for moving said carrier into proximity of a vehicle, vehicle handling mechanism carried by said carrier comprising a vehicle engaging member and means for operating said vehicle handling mechanism to bring said vehicle engaging member into engagement with a portion of said vehicle, said mechanism being then operative to roll said vehicle so that the wheels thereof roll along said runways to place said vehicle on said carrier.

44. In a vehicle storage structure, a vehicle carrier having vehicle wheel guiding runways thereon, means for moving said carrier into proximity of a vehicle, vehicle handling mechanism carried by said carrier comprising a vehicle wheel engaging member, means for operating said vehicle handling mechanism to bring said vehicle wheel engaging member into engagement with a wheel of said vehicle, said mechanism being then operative to roll the wheels of said vehicle along said runways onto said carrier.

45. In a vehicle storage structure, a vehicle carrier having fixed horizontal runways thereon, a vehicle storage stall, means for moving the carrier into proximity of said stall, mechanism carried by said carrier including a vehicle wheel engaging roller having a movement adapted to engage the wheel of a vehicle to propel said vehicle onto said runways from said stall for operating said mechanism.

46. In a vehicle storage structure, a vehicle carrier having fixed wheel guiding runways thereon, a vehicle storage stall, means for moving the carrier into association with said stall, mechanism carried by said carrier including a vehicle engaging member having a definite path of movement to engage a portion of the vehicle in a storage stall to roll said vehicle from said stall along said runways and means for operating said mechanism.

47. In a vehicle storage system, a vehicle carrier having fixed vehicle wheel guiding runways thereon, a pair of vehicle storage stalls facing one another and spaced apart to form a pathway between, means for moving said carrier between said pair of stalls, vehicle handling mechanism mounted on said carrier and movable therewith and with respect thereto, including a vehicle engaging member, guiding means on said carrier for guiding said mechanism toward either stall and means for operating said mechanism to draw a car with its wheels on said runways from either stall onto said carrier.

48. In a car transfer device, the combination with a wheeled truck and a motor thereon having a driving connection with the wheels of said truck whereby the same may be driven in either direction, of track rails extending across said truck and adapted to receive and support a car, a member mounted to reciprocate across the truck, car engaging means thereon adapted to engage a car for pulling the same onto said rails or to push the same off of said rails, and means to reciprocate said member.

49. In a car transfer device, the combination with a wheeled truck and a motor thereon having a driving connection with the wheels of said truck whereby the same may be driven in either direction, of track rails extending across said truck and adapted to receive and support a car, a member mounted to reciprocate across the truck, a pulling element carried by said member adapted to engage a part on a car to pull the same onto said rails, a pushing element on said member adapted to engage a part of said car to push the same from said rails, and means to reciprocate said member.

50. In a car transfer device, the combination with a wheeled truck and a motor thereon having a driving connection with the wheels of said truck whereby the same may be driven in either direction, of track rails extending across said truck and adapted to receive and support a car, a member mounted to reciprocate across the truck, a pulling element carried by said member adapted to engage a part on a car to pull the same onto said rails, a pushing element on said member adapted to engage a part of said car to push the same from said rails, means to reciprocate said member, and means acting to shift said pulling element from pulling position to pushing position when said pushing element is employed to push a car.

51. A car transfer truck comprising a wheeled frame, a motor on said frame and a driving connection between said motor and truck wheels whereby said truck may be driven in either direction, track rails extending across said frame, car pulling and pushing means arranged between said rails on the frame, a second motor on said frame, and a driving connection between said second motor and the pulling and pushing means whereby said means may be utilized to pull a car onto said rails or push the same therefrom.

52. A car transfer truck comprising a wheeled frame, a motor on said frame and a driving connection between said motor and truck, wheels whereby said truck may be driven in either direction, track rails extending across said frame, car pulling and pushing means arranged between said rails on the frame, a second motor on said frame, a driving connection between said second motor and the pulling and pushing means whereby said means may be utilized to pull a car onto said rails or push the same therefrom, and means operated by an operator on the truck for controlling the aforesaid motors.

53. In an automobile storage device for buildings having a plurality of floors, the combination of an elevator, extensible mechanism carried by said elevator for pushing and pulling automobiles, mechanism for projecting said extensible mechanism for at least the length of an automobile from said elevator and for retracting the same, and means associated with said extensible mechanism which prevents operation of said elevator when said extensible mechanism is projected outside the limits of said elevator.

54. In an automobile storage device for buildings having a plurality of floors, the combination of an elevator, a truck adapted to be carried by said elevator, mechanism for moving said truck off and on to the elevator, and means for preventing operation of said elevator when said truck is off the elevator.

55. In an automobile storage device for buildings having a plurality of floors, the combination of an elevator, a truck adapted to be carried by said elevator, extensible mechanism mounted on said truck for pushing and pulling automobiles, mechanism for projecting said extensible mechanism for at least the length of an automobile from said elevator and for retracting the same, mechanism for moving said truck off and on to the elevator, and means for preventing operation of said elevator when said extensible mechanism and said truck are off the elevator.

56. In an automobile storage device for buildings having a plurality of floors, the combination of an elevator, movable mechanism adapted to be carried by said elevator for moving automobiles off from and onto said elevator with relation to said floors, and means associated with said mechanism for preventing operation of said elevator when said movable mechanism is outside the limits of said elevator.

57. In an automobile storage device for buildings having a plurality of floors, the combination of an elevator, pushing and pulling mechanism consisting of a plurality of relatively movable parts adapted to be carried by said elevator for moving automobiles off from and onto said elevator with relation to said floors, and means associated with said mechanism for preventing operation of said elevator when said mechanism is outside the limits of said elevator.

58. An automobile storage device for buildings having a plurality of floors, comprising an elevator, a truck adapted to be carried by said elevator, pushing and pulling mechanism for automobiles mounted on said truck, and means for operating said mechanism.

59. An automobile storage device for buildings having a plurality of floors, comprising an elevator, a truck adapted to be carried by said elevator, extensible mechanism mounted on said truck and having one end adapted to be projected out beyond the elevator for engaging an automobile, and a motor for operating said extensible mechanism.

60. An automobile storage device for buildings having a plurality of floors, comprising an elevator, a truck adapted to be carried by said elevator, means for moving said truck off said elevator, extensible mechanism mounted on said truck, and means for operating said extensible mechanism in a direction at right angles to the movement of said truck.

61. A structure divided into a plurality of relatively fixed locations, and means operatively controlled from one of said locations for moving a vehicle therefrom to any of the other locations and for locking it therein when moved thereto.

62. A vehicle storage structure divided into a plurality of stalls and a loading station, a carrier and means controlled from said station for moving said carrier from said station to any desired stall and returning said carrier from said stall to said station.

63. A vehicle storage structure divided into a plurality of stalls and a loading station, mechanism in each stall for locking a vehicle therein, and means controlled from said station for transferring a vehicle from said station to any desired stall and locking it therein.

64. A vehicle storage structure divided into a plurality of stalls and a loading station, mechanism in each stall for locking a vehicle therein, and means controlled from said station to effect the transfer of a vehicle locked by said mechanism in any of said stalls from said stall to said station.

65. A vehicle storage structure divided into a plurality of horizontal groups of stalls arranged vertically in superposed tiers and a loading station, locking mechanism in each stall, a vehicle carrier normally located at said station and means operated from said station for moving said carrier therefrom to any desired stall and for moving a vehicle from said carrier into said stall for locking it therein.

66. In a vehicle storage structure, a stall, vehicle locking mechanism therein, releasing means operatively connected to said locking mechanism, and a vehicle carrier adapted to be moved to said stall and having means thereon to operate said releasing means and locking mechanism and remove a vehicle from said stall.

67. A vehicle storage structure divided into a plurality of stalls and a loading station, a plurality of interlocking switches at said station, each of which is connected to a particular stall, and means controlled by any of said switches for transferring a vehicle to said loading station from the stall connected to any switch operated.

68. In a vehicle storage structure, a stall, locking mechanism in said stall, and key controlled means for moving a vehicle into said stall and operating said mechanism to lock the vehicle therein.

69. In a vehicle storage structure, a stall, vehicle locking mechanism therein, releasing means operatively connected to said locking mechanism, and key controlled means for operating said means and mechanism.

70. In a vehicle storage structure, a stall, vehicle locking mechanism therein, and key controlled means for releasing a vehicle locked in said stall and moving the vehicle away from said stall.

71. In a vehicle storage structure, a stall, vehicle locking mechanism therein, a loading station, and key controlled mechanism operated from said station for releasing a vehicle locked in said stall and moving it to said station.

72. In a vehicle storage structure, a stall, a loading station remote therefrom, a vehicle carrier normally positioned adjacent said loading station, and means operatively controlled from said loading station for moving the carrier to said stall and moving a vehicle from said carrier into said stall and returning said carrier to its original position.

73. In a vehicle storage structure, a stall, a loading station remote from said stall, a vehicle carrier normally located at said station, and means operatively controlled from said station for moving the carrier from said station to said stall and removing a vehicle from the stall and returning the carrier with the vehicle to said station.

74. In a vehicle storage structure, a runway adapted to receive a vehicle wheel, a roller adapted to contact with said wheel, and means for moving said roller while in contact with said wheel along said runway.

75. A carrier having a runway thereon adapted to receive and guide the wheel of a vehicle, and pusher mechanism on said carrier having a part movable over said runway and adapted to contact with said wheel to push the vehicle off the carrier, and means for operating said mechanism.

76. In a vehicle storage system, a vehicle carrier movable in said system and having a wheel guiding runway thereon, a second carrier movable relatively to said vehicle carrier having a similar runway adapted to be alined with the first named runway, and means movable along and over one of said runways for moving a vehicle from one carrier to the other.

77. In a vehicle storage structure, a stall having wheel supporting runways therein, a carrier having a wheel guiding runway thereon, and means on said carrier and movable along said runway to engage the wheel of a vehicle positioned therein and move the vehicle from said carrier on to the stall runways.

78. In a vehicle storage structure, a stall having vehicle supporting runways, locking mechanism connected to said runways, a vehicle carrier having a wheel runway adapted to aline with one of said runways, and means on said carrier adapted, when said runway is alined with one of the stall runways, to move a vehicle from said carrier on to the stall runways and to operate said locking mechanism to lock the vehicle in the stall.

79. In a vehicle storage structure, a stall having vehicle supporting runways, locking mechanism connected to said runways, releasing mechanism operatively connected to said locking mechanism, a vehicle carrier having a runway adapted to aline with one of said stall runways, and means on said carrier adapted, when said runway is alined with one of the stall runways, to move over the alined stall runway and operate the releasing mechanism and draw the vehicle previously locked in the stall on to the carrier.

80. A vehicle carrier having a vehicle wheel guiding runway thereon, a wheel engaging arm movable lengthwise of said runway, and means on said carrier for moving said arm.

81. A vehicle carrier having a vehicle wheel guiding runway thereon; a wheel engaging arm positioned, when at rest, at one end and below said runway; and means for raising said arm from below said runway to the top thereof, along said runway to and beyond the other end thereof, and back to its rest position below said runway.

82. A vehicle carrier having a vehicle wheel guiding runway thereon, a lever having a fulcrum at one end and a wheel engaging roller at the other end, means for moving said lever across said carrier, and means for guiding said fulcrum during the movement of the lever across the carrier to maintain said roller approximately in contact with the top of said runway.

83. A vehicle carrier having a wheel engaging guide runway thereon, a lever having an arm at one end thereof, and means on said carrier wholly below said runway to move said lever across said carrier and maintain said arm in contact with said runway during the movements of the lever.

84. A vehicle carrier having a vehicle wheel guiding runway thereon, a lever having a wheel engaging roller at one end and a fulcrum at its other end, means connected to said lever intermediate its ends for moving it across said carrier, and cooperating guide means for said moving means and said fulcrum, to maintain the roller close to the top of said runway as the lever is moved across the carrier.

85. A vehicle carrier having a vehicle wheel guiding runway thereon, a lever having a wheel engaging roller at one end thereof positioned, when the lever is at rest, below said runway, and means below said runway for moving said lever to lift said roller to the top of said runway, move it to and beyond the end thereof, and return it to its rest position below the runway.

86. In vehicle pusher mechanism; a support having a vehicle wheel guiding runway thereon; a lever having a wheel engaging roller at one of its ends, positioned, when the lever is at rest, below the runway, and having a fulcrum at its other end; means for moving said lever across said carrier; a bifurcated guide having slots therein to guide said fulcrums; means connected to said lever intermediate its ends to move the said roller along said runway; and guide means cooperating with the bifurcated guide and said lever moving means to lift the roller from its rest position below the runway, move it along the runway to and beyond the end thereof, and return it to its rest position below the runway.

87. A vehicle carrier having a vehicle wheel guiding runway thereon, a wheel engaging pusher adapted to move over said runway, means rotatable in one direction only for moving said pusher along said runway, and mechanism connecting said pusher and said means for converting continuous rotation of said means into reciprocating movement of said pusher along said runway.

88. In vehicle moving mechanism a support having a vehicle wheel guiding runway thereon, a lever having a pusher arm at one end thereof movable along said runway, a fulcrum at the other end of said lever, a guide plate on said support having intersecting slots to guide said lever fulcrum, and cooperating means on said lever and said plate to shunt said fulcrum from one guide slot to the other when the lever is moved across the runway.

89. A combination as claimed in claim 88, in which the said cooperating fulcrum shunting means includes a cam on said lever adjacent the fulcrum, a plate pivoted on said guide plate near the intersection of said slots and having a member projecting laterally therefrom to contact with a side of said cam as the lever is moved across the intersection of said slots, thereby moving said pivoted plate to transfer said fulcrum from one slot to the other.

90. A vehicle storage structure divided into a plurality of stalls and a loading station, a vehicle carrier, means for moving said carrier from said station to any desired stall, a plurality of interlocking switches controlling the operation of said moving means from said station, and means set by the operation of any one of said switches to prevent the operation of all the other switches while the carrier is away from said station.

91. A switch comprising a fixed insulated support, a plurality of contacts spaced apart on said support, a brush normally out of contact with said contacts, means for locking said brush in non-contact position, and means to release said locking means and move the brush into contact with said contacts.

92. In electrical control mechanism, a switch board having a plurality of interlocking switches mounted thereon, each switch comprising a plurality of spaced apart contacts and a brush normally out of contact with said contacts, means for locking said brush in normal position, means for releasing said locking means and moving said brush into contact with said contacts, and means to prevent movement of said brush into contact position by said releasing means when any one of the other switches is in operation.

93. A vehicle storage structure divided into a plurality of stalls and a loading station, a carrier, means for moving said carrier from said station to any desired stall, a plurality of interlocking switches controlling the operation of said moving means, means set by the operation of any one of said switches to prevent the operation of any of the other switches while the carrier is away from the loading station, and means operated by the return of said carrier to said station to release all of said switches and permit the operation of any one of them.

94. In a vehicle storage system, a stall, a loading station remote from said stall, a carrier, mechanism to move said carrier from station to said stall and back to said station, a source of energy for operating said mechanism, a switch controlling said source of energy, and means connected to said switch to prevent disconnection of the source of energy supply to said mechanism, while the carrier is away from said station.

95. In a vehicle storage system, a stall, a loading station remote from said stall, a carrier, mechanism to move said carrier from said station to said stall and back to said station, a source of operating energy for said mechanism, a switch controlling said source of energy, means connected to said switch to prevent disconnection of energy supply to said mechanism while the carrier is away from said station, and means operated by the return of said carrier to said station for releasing the last named means.

96. In a vehicle carrier storage system, a stall, a loading station remote from said stall, a vehicle carrier normally located at said station, mechanism controlled from said station for moving the carrier to said stall and back to said station and means to prevent stoppage of said mechanism while the carrier is away from said station.

97. A vehicle storage structure divided into a plurality of stalls and a loading station, a vehicle carrier normally located at said station, mechanism for moving said carrier from said station to any desired stall and returning it to said station, said mechanism including electric motors mounted on said carrier, contacts suitably secured on the fixed framework of the structure, circuit makers and breakers positioned on said carrier to cooperate with said contacts, and means at said station controlling the supply of energy from a source of supply of said contacts to determine the movement of the carrier to and from any desired stall in the structure.

98. A circuit maker and breaker adapted for use in a system of the class described, comprising a support, a magnet fixed to said support, a contact screw having one end of the wiring of said magnet secured thereto, a second contact screw to which the other end of the magnet wiring is secured, an arm having one end thereof pivoted to said contact screw, an armature insulated from and mounted on said arm in position to move the arm toward the magnet when the latter is energized, a contact carrier slidably mounted on said support and having an arm projecting into contact with the free end of the first named arm, a contact block slidably mounted in the carrier arm and held yieldingly projecting therefrom, a contact plate adapted to be secured to a fixed member of the system to energize said magnet and raise the first named arm to release its free end from contact with the second named arm, an insulated block on top of the second named arm, said plate being positioned on said fixed member to force the second named arm under the first named arm when the latter is raised by the magnet and interpose the said insulated block between said arms to break the circuit through said block and plate.

99. In a system of the class described, the combination with a source of electrical energy, of a spring controlled latch switch interposed in a normally open circuit including said source of supply; locking and releasing magnets for said switch, a contact plate also included in said circuit and secured to a fixed part of the system; a circuit maker and breaker mounted on a member movable relatively to said fixed part and operatively connected to one of said magnets; and having a block projecting yieldingly therefrom to ride on and make yielding contact with said plate, when the movable member arrives at said fixed part, to close the circuit through the latch switch magnet to which the circuit maker and breaker is connected; and means for breaking said circuit immediately after its closing and while said block and plate are in contact.

100. In a vehicle storage system, the combination with a carrier having runways thereon, a vehicle wheel engaging member having a reciprocating movement associated with said carrier for moving a vehicle along said runways, and power driven mechanism mounted on the carrier for reciprocating said member.

101. In a vehicle storage system, the combination with a vehicle carrier, a roller carried by said carrier and movable with respect to it, means for positioning a vehicle on said carrier, and means including said roller for moving said vehicle off said carrier, and mechanism mounted on said carrier for operating said last means.

102. In a vehicle storage system, the combination with a vehicle carrier, of a vehicle wheel engaging roller associated with said carrier and movable with respect to it, means for placing a vehicle on said carrier, means for moving said roller to engage a wheel of the vehicle and mechanism mounted on said carrier for operating the last mentioned means.

103. In a vehicle storage system, the combination with a vehicle carrier, of a vehicle wheel engaging roller associated with said carrier and movable with respect to it, means for placing a vehicle on said carrier, and mechanical means mounted on the carrier for moving said roller to engage a wheel of the vehicle to roll said vehicle off said carrier.

104. In a vehicle storage system, the combination with a movable vehicle carrier, a member mounted on said carrier having a pivoted roller attached thereto, means for placing a vehicle on said carrier, a motor for moving the member carrying the roller into engagement with a vehicle wheel to move the vehicle from the carrier.

105. In a vehicle storage system, the combination with a plurality of storage stalls, of a vehicle carrier adapted to be moved into proximity of any stall, a vehicle wheel engaging roller mounted on said carrier and mechanism mounted on the carrier for operating said roller into engagement with a wheel of the vehicle to move a vehicle from said carrier.

106. In a vehicle storage structure, a plurality of storage stalls, a vehicle carrier adapted to move in proximity to any one of the stalls, means for placing a vehicle on the carrier, vehicle moving means mounted on a carrier adapted to move the vehicle into the proximate stall, locking mechanism associated with the stall adapted to lock the vehicle therein, said locking mechanism being operated by the vehicle moving mechanism.

107. In a vehicle storage structure, a plurality of vehicle storage stalls, locking mechanism associated with each stall and adapted to maintain a vehicle therein, a vehicle carrier adapted to be moved into proximity to any stall, and vehicle moving means associated with said carrier and operative to release the locking mechanism in the stall proximate to the carrier.

108. In a vehicle storage system, a plurality of stalls and a vehicle carrier adapted to be moved into proximity to any stall, vehicle moving means mounted on the carrier, means operative to position the carrier in front of a stall containing a vehicle, vehicle moving mechanism including a vehicle wheel engaging roller mounted on said carrier, and means including said roller for moving a vehicle from the stall to the carrier.

109. In a vehicle storage system, a plurality of stalls and a vehicle carrier adapted to be moved into proximity to any stall, means operative to position the carrier in front of a stall containing a vehicle, power operated vehicle moving mechanism including a vehicle wheel engaging roller permanently mounted on said carrier, and means controlled by the roller for moving a vehicle from the stall to the carrier.

110. A vehicle storage structure divided into a plurality of stalls and a loading station, mechanism in each stall for locking a vehicle therein, and means controlled from said station to effect the transfer of a vehicle locked by said mechanism in any of said stalls from said stall to said station.

111. A vehicle storage structure divided into a plurality of stalls and a loading station, a plurality of interlocking switches at said station each of which is connected to a particular stall, and means controlled by any of said switches for transferring a vehicle from the loading station to and into the stall connected to any switch operated.

112. In a vehicle storage structure, a stall, means for moving a vehicle into said stall, a normally locked switch controlling the operation of said means, and a key for unlocking said switch.

113. In a vehicle storage structure, a stall, vehicle locking mechanism therein, a loading station, and key controlled mechanism operated from said station for releasing a vehicle locked in said stall and moving it to said station.

114. In a vehicle storage structure, a stall, a loading station remote from said stall, a vehicle carrier normally located at said station, and means operatively controlled from said station for moving the carrier from said station to said stall and removing a vehicle from the stall and returning the carrier with the vehicle to said station.

115. In a vehicle storage structure, a stall having fixed vehicle supporting horizontal runways, locking mechanism connected to said runways, a vehicle carrier having a wheel runway adapted to aline with one of said runways, and means on said carrier adapted, when said runway is alined with one of the stall runways, to move a vehicle from said carrier on to the stall runways and to operate said locking mechanism to lock the vehicle in the stall.

116. A vehicle storage structure having a plurality of groups of stalls horizontally arranged in vertical tiers spaced apart to form runways for a vehicle carrier, guide rails fixed in pairs to said structure adjacent the floor of each stall, a carrier adapted to move on said rails, mechanism for moving the carrier from one pair of guide rails in any tier to a pair of similar guide rails in any other tier, and means remote from the carrier to control the operation of said mechanism.

117. A vehicle carrier having a wheel guiding runway thereon, a pusher member normally below one end of said runway, and means for moving said member from below and over the runway lengthwise thereof.

118. A vehicle carrier having a wheel guiding runway thereon, a pusher member normally below said runway near the end thereof, and means for raising said member, moving it lengthwise over said runway to and beyond the other end thereof, and moving it back to normal position.

119. A vehicle carrier having fixed runways thereon, means including a vehicle engaging member reciprocable over each of said runways to move a vehicle in opposite directions thereon, and power mechanism carried solely on the carrier for operating said means.

120. In a vehicle storage structure, a vehicle carrier having fixed horizontal runways thereon, a vehicle storage stall, means for moving the carrier with a vehicle, having its wheels resting on said runways into proximity of said stall, mechanism including a movable wheel engaging roller operative to engage a wheel of the vehicle to roll the vehicle along said runway into said stall and automatic means for operating said mechanism.

121. In a vehicle storage system, a vehicle carrier having fixed horizontal runways thereon, a pair of vehicle storage stalls facing one another and spaced apart to form a pathway between, means for moving the carrier with a vehicle, having its wheels resting on said runways in said pathway, adjacent said pair of stalls, and mechanism carried by the carrier including wheel engaging rollers operative to roll a vehicle along said runway in either direction into either stall.

122. In a vehicle storage structure, a vehicle carrier having fixed horizontal runways thereon, a pair of vehicle storage stalls facing each other and spaced apart to form a pathway between, a runway in each stall, means for moving the carrier into said pathway adjacent said pair of stalls, mechanism including vehicle engaging members carried by the carrier and operative to engage a portion of the vehicle to bring about the rolling of a vehicle from either stall onto the runway of the carrier and automatic means for operating said mechanism.

123. In an automobile storage system, the combination with a plurality of oppositely disposed storage stalls spaced apart to form a pathway between, an automobile carrier adapted to move in said pathway, power mechanism for moving said carrier along said pathway into association with any stall, and a fixed horizontal automobile runway on said carrier extending at substantially right angles to the directions of movement of the carrier, of automobile moving mechanism carried solely on said carrier including an automobile engaging member, means for causing the operation of said vehicle moving mechanism to bring said member into automobile engaging position, means for then operating said moving mechanism to roll an automobile into a stall on one side of said pathway along said carrier runway, and guiding means on said carrier cooperating with said moving mechanism during its operation.

124. In a vehicle storage system, vehicle handling apparatus comprising a carrier frame having a movement of two directions, mechanism for moving said frame, a truck carried by said frame movable therewith and with respect thereto and mechanism carried by said truck for moving it off said carrier frame and vehicle wheel engaging rollers mounted on said truck for movement therewith and with respect thereto.

125. In a garage for storing vehicles, the combination with an elevator for receiving a vehicle and another vehicle receiving means, of means movable on said elevator, said means being movable beneath the vehicle and engageable therewith to move said vehicle from said elevator into said other vehicle receiving means, guiding means for said movable means, and independent guiding means for said vehicle while the latter is being transferred.

126. In a garage for storing vehicles, the combination with a movable vehicle carrier and a vehicle receiving means, of means movable on said carrier, said means being movable beneath the vehicle and engageable therewith to move said vehicle from said carrier into said vehicle receiving means, guiding means for said vehicle while the latter is being transferred.

127. In a garage for storing vehicles, the combination with a movable vehicle carrier and a vehicle receiving means, of means movable on said carrier, said means being movable beneath the vehicle and engageable therewith to move said vehicle from said carrier into said vehicle receiving means, guiding means for said movable means and independent guiding means for said vehicle while the latter is being transferred.

128. A garage building having tiers of storage compartments and an elevator well adjacent the storage compartments, an elevator in the well, a transfer device mounted on the elevator and movable off of the elevator into the storage compartments and back from the storage compartments on to the elevator for transferring cars directly from the elevator to the storage compartments and from the storage compartments to the elevator, a motor for driving the transfer device, and cooperating means on the transfer carriage and elevator well for preventing operation of the elevator at all times except when the transfer carriage is properly positioned thereon.

129. In a garage for storing vehicles, the combination of an inlet for said vehicles, a storage compartment, a transfer table movable adjacent said compartment, a carrier on said transfer table movable from the latter to an inlet, said carrier being also movable to a selected storage compartment, an electric motor for driving said carrier, automatic means for breaking the circuit to said motor when the carrier is properly positioned at the storage compartment, and automatic means for breaking the circuit to said motor when the carrier is properly positioned at the inlet.

130. In a garage for storing vehicles, the combination of an inlet for said vehicles, vehicle receiving means, a transfer table movable adjacent said vehicle receiving means, a carrier on said transfer table for moving a vehicle from said transfer table to said vehicle receiving means, an electric motor for driving said carrier, and automatic means for breaking the circuit to said motor when the carrier is properly positioned at the vehicle receiving means.

131. An apparatus for loading and unloading vehicles including a platform, vehicle moving means supported on the platform, vehicle engaging means carried by the vehicle moving means, means on the platform for actuating the engaging means to engage and disengage a vehicle, means operable on the platform independently of said actuating means for operating the vehicle moving means in one direction to draw the vehicle onto the platform and in reverse direction to remove the vehicle from the platform, and a securing lock spaced from the platform and operable by said actuating means for locking the vehicle from movement in the direction of the platform after the vehicle is removed therefrom.

132. An apparatus for loading and unloading vehicles including a movable platform, vehicle moving means supported on the platform, means on the platform for operating the vehicle moving means to draw a vehicle into the platform and to remove the vehicle from the platform, a securing lock spaced from the platform and adjacent the path of travel of the vehicle moving means, and means associated with the securing lock and located in position to be engaged by the vehicle moving means for automatically locking the vehicle from movement after the vehicle is removed from the platform.

133. An apparatus for loading and unloading vehicles including a platform, vehicle moving means supported on the platform, vehicle engaging means carried by the vehicle moving means, means carried by the platform for actuating the vehicle moving means in opposite directions to move the vehicle engaging means across the platform, means for moving the vehicle moving means to project the vehicle engaging means beyond the platform to engage the vehicle so that the vehicle is drawn onto the platform upon movement of the vehicle moving means in one direction and removed from the platform upon movement of the vehicle moving means in the opposite direction, a securing lock spaced from the platform and located adjacent said vehicle engaging means when it is projected from the platform for locking the vehicle from movement after the vehicle is removed from the platform, and means movable with the vehicle moving means for actuating the securing lock.

ROBERT T. JENNEY.